US006807426B2

(12) United States Patent
Pankaj

(10) Patent No.: US 6,807,426 B2
(45) Date of Patent: Oct. 19, 2004

(54) METHOD AND APPARATUS FOR SCHEDULING TRANSMISSIONS IN A COMMUNICATION SYSTEM

(75) Inventor: Rajesh K. Pankaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 09/974,933

(22) Filed: Oct. 10, 2001

(65) Prior Publication Data

US 2002/0183066 A1 Dec. 5, 2002

Related U.S. Application Data

(60) Provisional application No. 60/283,885, filed on Apr. 12, 2001.

(51) Int. Cl.[7] ................................................. H04Q 7/20
(52) U.S. Cl. ....................... 455/453; 455/450; 455/451; 455/452.1; 455/446; 455/447; 455/436; 370/329; 370/468; 370/328; 370/330; 370/335; 370/338; 370/356; 370/341; 370/342; 370/431; 370/441; 370/442; 370/429
(58) Field of Search ............................. 370/468, 230.1, 370/328, 329, 330, 335, 341, 342, 337, 397, 398, 412, 428, 429, 431, 441, 442, 464, 465, 338, 349, 351–356; 455/450, 451, 453, 436, 446, 452

(56) References Cited

U.S. PATENT DOCUMENTS

| | | | |
|---|---|---|---|
| 4,901,307 A | | 2/1990 | Gilhousen et al. |
| 5,101,501 A | | 3/1992 | Gilhousen et al. |
| 5,103,459 A | | 4/1992 | Gilhousen et al. |
| 5,706,288 A | * | 1/1998 | Radhakrishnan et al. ... 370/418 |
| 5,859,835 A | | 1/1999 | Varma et al. |
| 5,886,993 A | * | 3/1999 | Ruszczyk et al. ........... 370/451 |
| 5,889,779 A | * | 3/1999 | Lincoln ...................... 370/398 |
| 5,923,650 A | * | 7/1999 | Chen et al. ................. 370/331 |
| 6,038,217 A | * | 3/2000 | Lyles ......................... 370/233 |
| 6,064,678 A | | 5/2000 | Sindhushayana et al. |
| 6,072,784 A | * | 6/2000 | Agrawal et al. ............ 370/311 |
| 6,101,193 A | * | 8/2000 | Ohba ......................... 370/429 |
| 6,115,360 A | * | 9/2000 | Quay et al. ................. 370/235 |
| 6,157,614 A | * | 12/2000 | Pasternak et al. ........... 370/236 |
| 6,377,583 B1 | * | 4/2002 | Lyles et al. ................. 370/412 |
| 6,408,005 B1 | * | 6/2002 | Fan et al. ................... 370/412 |
| 6,459,687 B1 | * | 10/2002 | Bourlas et al. ............. 370/328 |
| 6,515,963 B1 | * | 2/2003 | Bechtolsheim et al. ..... 370/229 |

FOREIGN PATENT DOCUMENTS

| | | |
|---|---|---|
| WO | 98/35514 | 8/1998 |
| WO | 99/23844 | 5/1999 |
| WO | 01/54335 A1 | 7/2001 |

OTHER PUBLICATIONS

T.S. Eugene Ng et al. "Packet Fair Queueing Algorithms for Wireless Networks with Location–Dependent Errors," INFOCOM 98. 17th Annual Joint Conference of the IEEE Computer and Communications Societies. Proceedings, IEEE San Francisco, CA, Mar. 29 to Apr. 2, 1998; New York, NY, Mar. 29, 1998, pp. 1103–1111.

(List continued on next page.)

Primary Examiner—Marceau Milord
(74) Attorney, Agent, or Firm—Phil R. Wadsworth; Sandra L. Godsey

(57) ABSTRACT

Method and apparatus for a generalized scheduler for scheduling transmissions in a communications system. The scheduler is defined by a priority function of the channel condition and fairness criteria. The generalized scheduler is adapted to apply a variety of combinations of channel condition metrics and user fairness metrics. The scheduler distinguishes among classes of users, allowing individual processing per class. In one embodiment, a system controller receives a Delivery Priority Parameter (DPP) for each of a plurality of users, and maps each DPP to a corresponding common Mapped Priority Parameter (MPP). An operating point is determined and a corresponding MPP value for each of the users is applied to schedule transmissions.

19 Claims, 15 Drawing Sheets

OTHER PUBLICATIONS

A. Stamoulis et al. "Packet Fair Queueing Scheduling Based on Multirate Multipath–Transparent CDMA for Wireless Networks," INFOCOM 2000. 19$^{th}$ Annual Joint Conference of the IEEE Computer and Communications Societies. Proceeding IEEE Tel Aviv, Israel, Mar. 26–30, 2000; Piscataway, NJ, USA, Mar. 26, 2000, pp. 1067–1076).

Matthew Andrews, et al. "Providing Quality of Service over a Shared Wireless Link" IEEE Communications Magazine, Feb. 2001.

Matthew Andrews, et al. "Providing Quality of Service over a Shared Wireless Link" IEEE Communications Magazine, Feb. 2001.

* cited by examiner

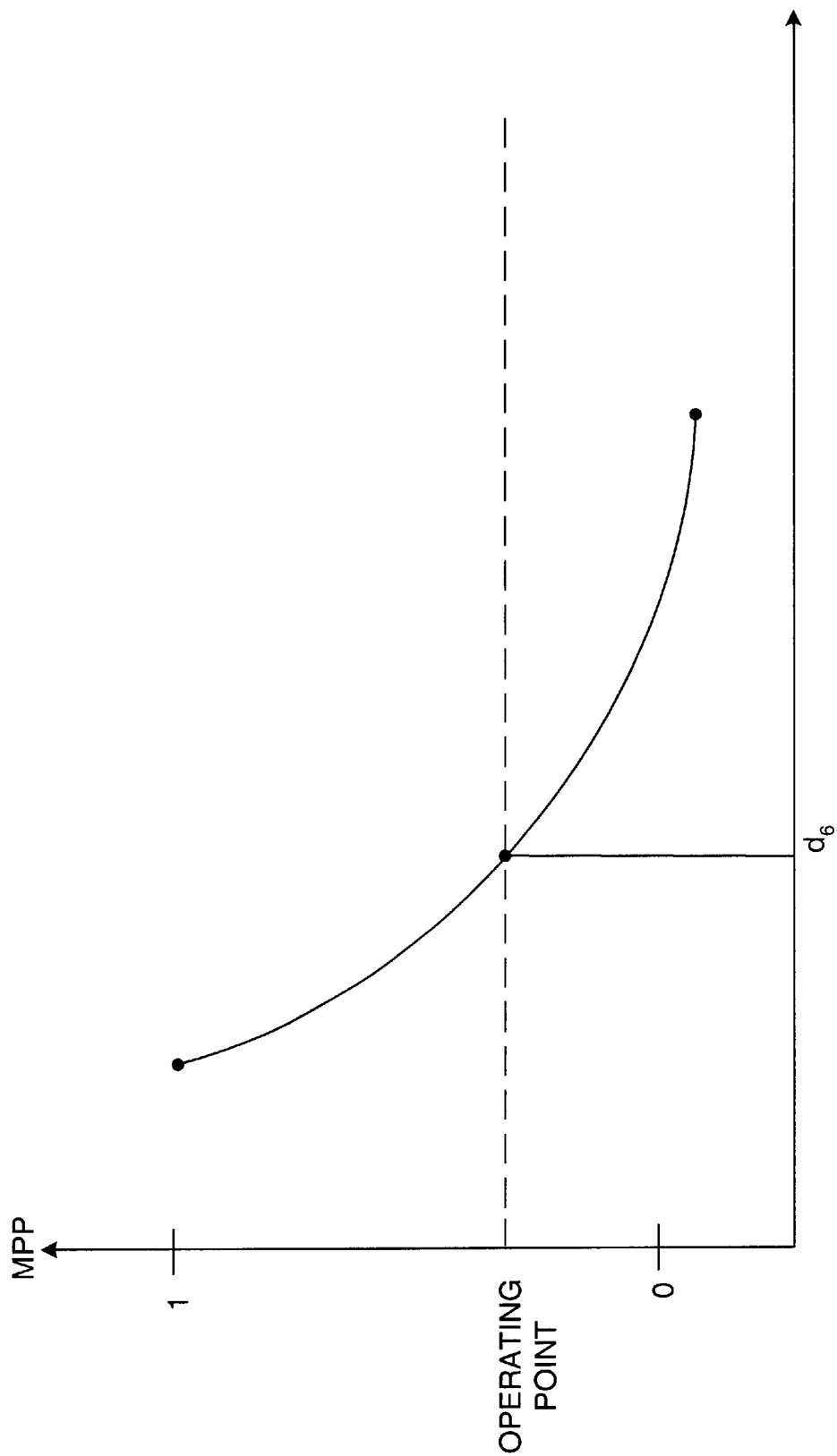

METHOD AND APPARATUS FOR SCHEDULING TRANSMISSIONS IN A COMMUNICATION SYSTEM

CLAIM OF PRIORITY UNDER 35 U.S.C. §120

The present Application for Patent claims priority of U.S. Provisional Application No. 60/283,885, filed Apr. 12, 2001, assigned to the assignee hereof and hereby expressly incorporated by reference herein.

REFERENCE TO RELATED CO-PENDING APPLICATIONS

The present Application for Patent is related to U.S. application Ser. No. 09/796,583, filed Feb. 27, 2001, entitled "SYSTEM FOR ALLOCATING RESOURCES N A COMMUNICATION SYSTEM," which is a continuation for U.S. Pat. No. 6,229,795 B1, entitled "SYSTEM FOR ALLOCATING RESOURCES IN A COMMUNICATION SYSTEM," issued Apr. 8, 2001, by Pankaj et al., assigned to the assignee hereof and hereby expressly incorporated by reference herein.

BACKGROUND

1. Field

The present invention pertains generally to communications, and more specifically to a method and apparatus for scheduling transmissions in a communication system.

2. Background

Communication systems, and wireless systems in particular, are designed with the objective of efficient allocation of resources among a variety of users. Wireless systems in particular aim to provide sufficient resources to satisfy the requirements of all subscribers while minimizing costs. Various scheduling algorithms have been developed, each based on a predetermined system criteria.

In a wireless communication system employing a Code Division-Multiple Access, CDMA, scheme, one scheduling method assigns each of the subscriber units all code channels at designated time intervals on a time multiplexed basis. A central communication node, such as a Base Station, BS, implements the unique carrier frequency or channel code associated with the subscriber to enable exclusive communication with the subscriber. TDMA schemes may also be implemented in landline systems using physical contact relay switching or packet switching. A CDMA system may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, or (4) some other wireless standard.

In a communication system, and a wireless system in particular, users are typically assigned to classes, wherein each class has an associated system performance criteria. For example, each class may be treated differently with respect to a fairness criteria, wherein each user in a class is treated similarly. Classes may be treated according to the priority of each class. In one system, users are classified according to services used in the system, such as according to a service plan. Several classes may be present within one communication system.

Accordingly, there is a need for a method and apparatus for scheduling transmissions in a communication system with application to multiple classes of users. Additionally, there is a need for a scheduling method and apparatus that accommodates a variety of different scheduling priorities.

SUMMARY

Embodiments disclosed herein address the above stated needs by providing a means for scheduling data transmissions in a wireless communication system. A generalized scheduler allows scheduling of multiple mobile stations, wherein each mobile station may have a different delivery priority parameter. The delivery priority parameter defines the parameter used to affect the desired data transmission delivery rate. For example, a delivery priority parameter may be desired throughput, desired time allotment, desired time delay, etc. The delivery priority parameter values are each mapped to a common scale, referred to as a mapped priority parameter. An operating point is then selected and the corresponding mapped priority parameter values for each mobile user extracted. The generalized scheduler then schedules mobile users using a common mapped priority parameter value. In other words, each user is scheduled to achieve a same proportion within the corresponding delivery priority parameter range.

According to one aspect, in a wireless communication system a scheduling method includes receiving channel condition indicators from a plurality of mobile users, wherein the channel condition indicators correspond to forward link communications, determining a fairness indicator as a function of throughput to the plurality of mobile users, and determining a transmission schedule for the plurality of mobile users, wherein the transmission schedule is a function of the channel condition indicators and fairness indicators.

In another aspect, a program embodied on a computer-readable medium containing computer-executable instructions, includes a first set of instructions for processing channel condition indicators received from a plurality of mobile users, a second set of instructions for determining a fairness indicator as a function of throughput to the plurality of mobile users, and a third set of instructions for determining a transmission schedule for the plurality of users as a function of the channel condition indicators and the fairness indicators.

In still another aspect, a method for transmitting data between one remote station of a plurality of remote stations and a base station in a wireless communication system includes receiving at the base station information transmitted by the one remote station, and adjusting at least one grade of service parameter particular to the one remote station based on the information.

In yet another aspect, a method for scheduling data transmissions in a wireless communication system includes receiving a value for a delivery priority parameter from each of a plurality of mobile users, if any of the delivery priority parameters are different types, mapping each delivery priority parameter to a mapped priority parameter, and determining an operating point based on the mapped priority parameters of the plurality of mobile users.

According to another aspect, an apparatus in a wireless communication system includes a processing element, and a memory storage element coupled to the processing element, the memory storage element adapted for storing computer-readable instructions for implementing: receiving a delivery priority parameter from each of a plurality of mobile user, mapping each delivery priority parameter to a mapped priority parameter, and determining an operating point based on the mapped priority parameters of each the plurality of mobile users.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein:

FIGS. 9B, 9C, and 9D illustrate determination of various operating points over multiple mapped priority parameters.

DETAILED DESCRIPTION OF THE INVENTION

A modern day communication system is required to support a variety of applications. One such communication system is a code division multiple access (CDMA) system which conforms to the "TIA/EIA-95 Mobile Station-Base Station Compatibility Standard for Dual-Mode Wideband Spread Spectrum Cellular System" and its progeny, hereinafter referred to as IS-95. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

In a CDMA system, communications between users are conducted through one or more base stations. In wireless communication systems, forward link refers to the channel through which signals travel from a base station to a subscriber station, and reverse link refers to channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial Internet through a connection with a serving base station. In wireless communications such as those conforming to IS-95, forward link and reverse link signals are transmitted within disjoint frequency bands.

Figure 1A:
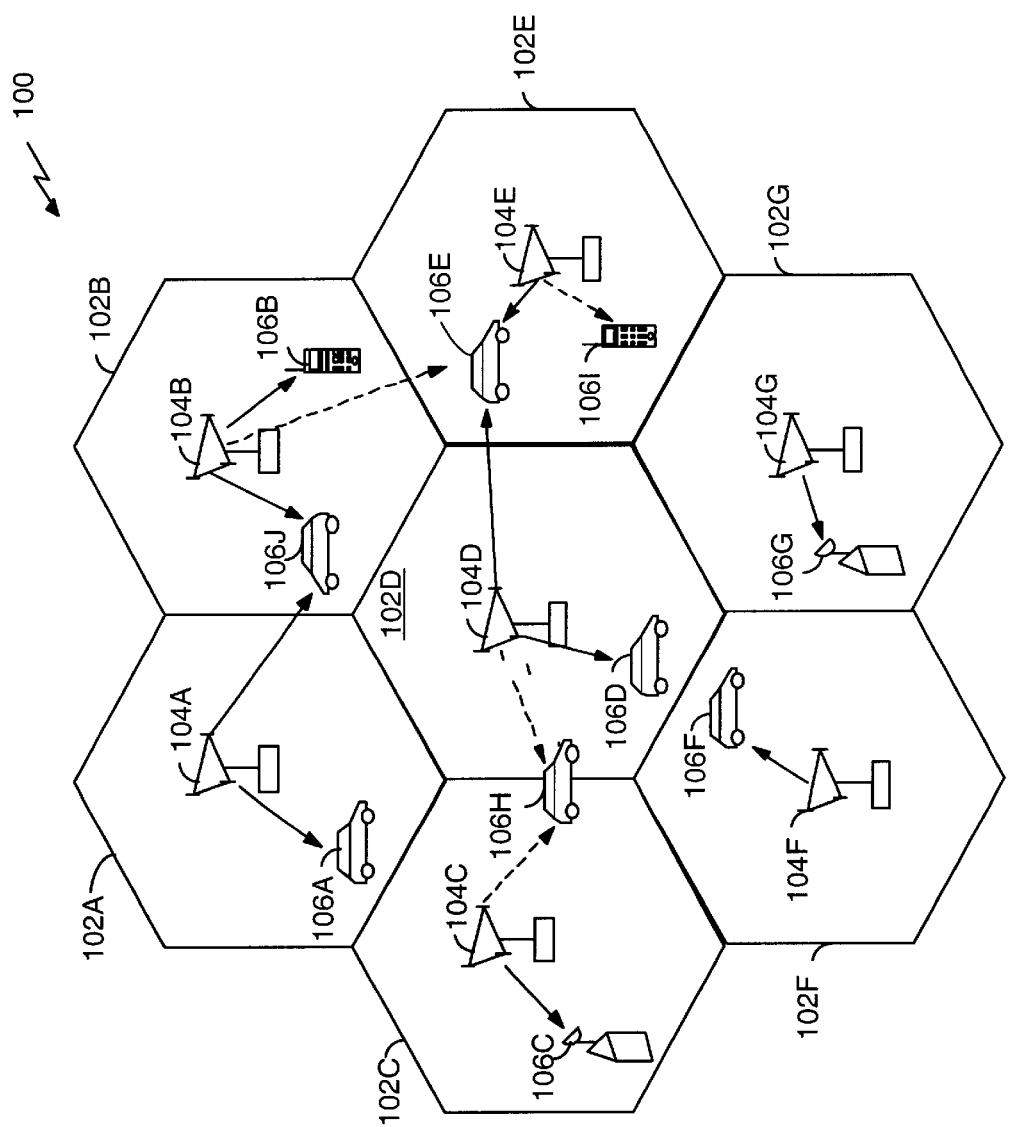
FIG. 1A is a wireless communication system.

FIG. 1A serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1A, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1A, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1A is consistent with a CDMA type system having HDR service.

Figure 1B:
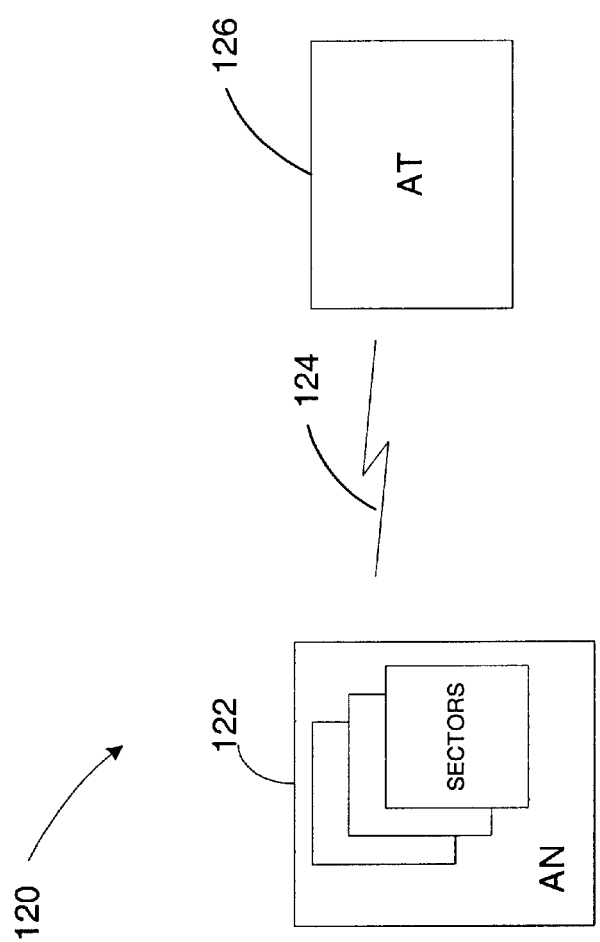
FIG. 1B is a wireless communication system supporting high data rate transmissions.

FIG. 1B illustrates an architecture reference model for a communication system 120 having an Access Network, AN, 122 communicating with an Access Terminal, AT, 126 via an air interface 124. In one embodiment, the system 10 is a Code Division-Multiple Access, CDMA, system having a High Data Rate, HDR, overlay system, such as specified the HDR standard. The AN 122 communicates with AT 126, as well as any other ATs within system 120 (not shown), by way of the air interface 124. The AN 122 includes multiple sectors, wherein each sector provides at least one Channel. A Channel is defined as the set of communication links for transmissions between the AN 122 and the ATs within a given frequency assignment. A Channel consists of a Forward Link (FL) for transmissions from the AN 122 to AT 126 and a Reverse Link (RL) for transmissions from the AT 126 to the AN 122.

For data transmissions, the AN 122 receives a data request from the AT 126. The data request specifies the data rate at which the data is to be sent, the length of the data packet transmitted, and the sector from which the data is to be sent. The AT 126 determines the data rate based on the quality of the Channel between AN 122 and AT 126. In one embodiment the quality of the Channel is determined by the Carrier-to-Interference ratio, C/I. Alternate embodiments may use other metrics corresponding to the quality of the Channel. The AT 126 provides requests for data transmissions by sending a Data Rate Control, DRC, message via a specific channel referred to as the DRC channel. The DRC message includes a data rate portion and a sector portion. The data rate portion indicates the requested data rate for the AN 122 to send the data, and the sector indicates the sector from which the AN 122 is to send the data. Both data rate and sector information are typically required to process a data transmission. The data rate portion is referred to as a DRC value, and the sector portion is referred to as a DRC cover. The DRC value is a message sent to the AN 122 via the air interface 124. In one embodiment, each DRC value corresponds to a data rate in kbits/sec having an associated packet length according to a predetermined DRC value assignment. The assignment includes a DRC value specifying a null data rate. In practice, the null data rate indicates to the AN 122 that the AT 126 is not able to receive data. In one situation, for example, the quality of the Channel is insufficient for the AT 126 to receive data accurately.

In operation, the AT 126 continuously monitors the quality of the Channel to calculate a data rate at which the AT 126 is able to receive a next data packet transmission. The AT 126 then generates a corresponding DRC value; the DRC value is transmitted to the AN 122 to request a data transmission. Note that typically data transmissions are partitioned into packets. The time required to transmit a packet of data is a function of the data rate applied.

This DRC signal also provides the information, which the channel scheduler uses to determine the instantaneous rate for consuming information (or receiving transmitted data) for each of the remote stations associated with each queue.

According to an embodiment, a DRC signal transmitted from any remote station indicates that the remote station is capable of receiving data at any one of multiple effective data rates. Such a variable rate transmission system is described in detail in U.S. Pat. No. 6,064,678, entitled "Method for Assigning Optimal Packet Lengths in a Variable Rate Communication System," issued May 16, 2000, assigned to the assignee of the present invention and incorporated by reference herein.

Figure 7:
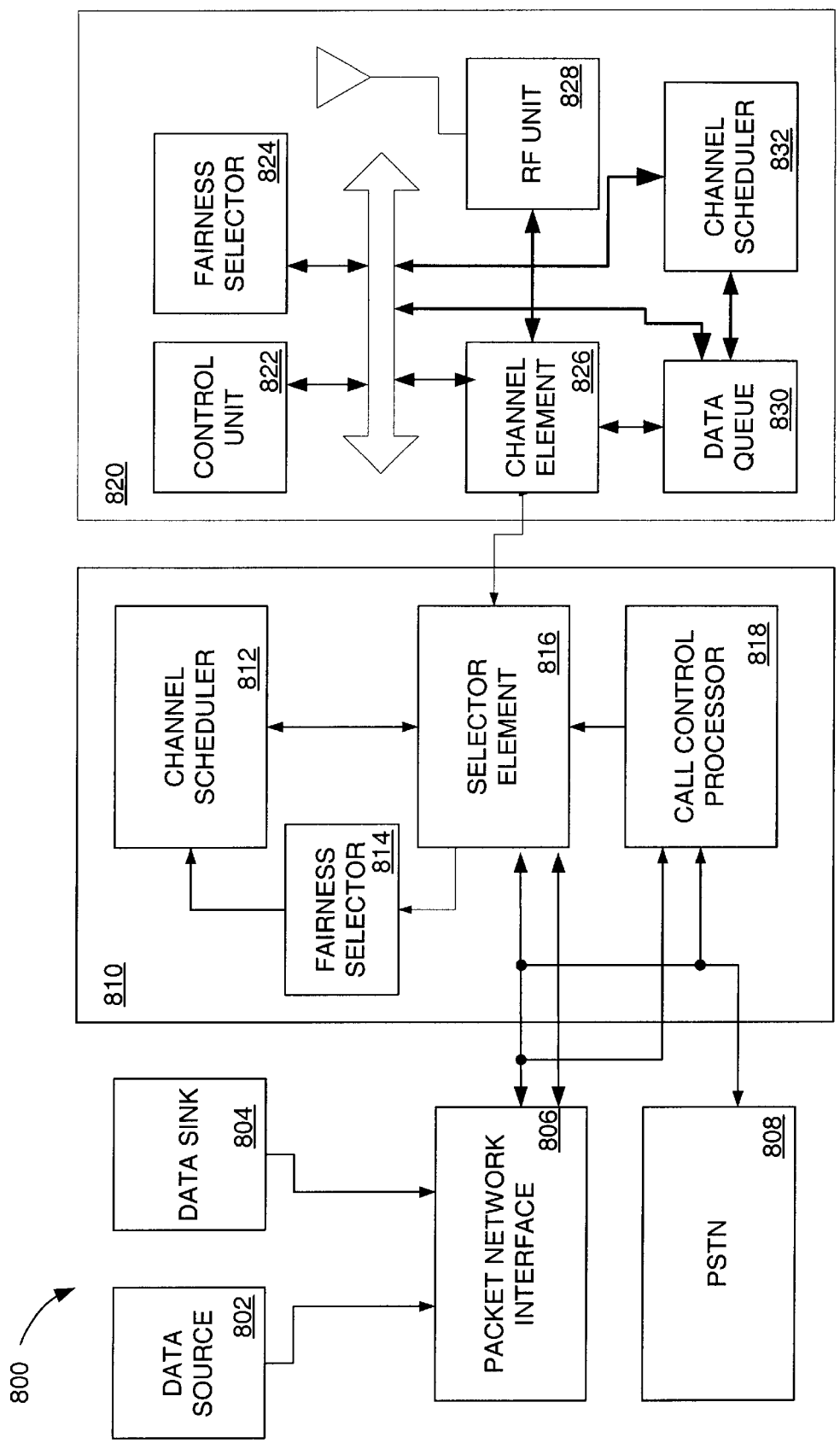
FIG. 7 is a wireless communication system supporting a combination scheduling algorithm such as illustrated in FIGS. 5 and 6.

One example of a communication system supporting HDR transmissions and adapted for scheduling transmissions to multiple users is illustrated in FIG. 7. FIG. 7 is detailed hereinbelow, wherein specifically, a base station 820 and base station controller 810 interface with a packet network interface 806. Base station controller 810 includes a channel scheduler 812 for implementing a scheduling algorithm for transmissions in system 800. The channel scheduler 812 determines the length of a service interval during which data is to be transmitted to any particular remote station based upon the remote station's associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data $R_i$ determines the service interval length $L_i$ associated with a particular data queue.

In addition, the channel scheduler 812 selects the particular data queue for transmission. The associated quantity of data to be transmitted is then retrieved from a data queue 830 and provided to the channel element 826 for transmission to the remote station associated with the data queue 830. As discussed below, the channel scheduler 812 selects the queue for providing the data, which is transmitted in a following service interval using information including the weight associated with each of the queues. The weight associated with the transmitted queue is then updated.

Note that it may be possible for the user to receive a packet correctly even if only a portion of the packet is transmitted. This occurs when the channel condition is better than anticipated by the user. In that case, the user may send an "ACK" signal to the base station indicating that the packet is already correctly received and the remaining portions of the packet need not be transmitted. When this happens, the entire data packet is effectively transmitted to the user over a shorter service interval thereby increasing the effective data rate at which the packet is transmitted. The base station then reassigns the time slots that were originally scheduled to transmit the remaining portions of that packet to transmit another packet either to the same user or to a different user. This process is generally referred to as Automatic Repeat reQuest (ARQ).

In a system supporting ARQ, a data packet is scheduled for a predetermined number of transmissions, wherein each transmission may include different information. The multiple transmissions are interposed with other packets sequentially. When a receiver has received sufficient information to decode and process the packet, the receiver sends an indication to the transmitter that no further information is required for the current packet. The transmitter is then free to schedule the slots originally scheduled for the current packet to another packet. In this way, the system resources are conserved and the transmission time to the receiver is reduced.

A block diagram illustrating the basic subsystems of an exemplary variable rate communication system is shown in FIG. 7. Base station controller 810 interfaces with packet network interface 806, Public Switched Telephone Network, PSTN, 808, and all base stations in the communication system (only one base station 820 is shown in FIG. 7 for simplicity). Base station controller 810 coordinates the communication between remote stations in the communication system and other users connected to packet network interface 806 and PSTN 808. PSTN 808 interfaces with users through a standard telephone network (not shown in FIG. 7).

Base station controller 810 contains many selector elements 816, although only one is shown in FIG. 7 for simplicity. Each selector element 816 is assigned to control communication between one or more base stations 820 and one remote station (not shown). If selector element 816 has not been assigned to a given remote station, call control processor 818 is informed of the need to page the remote station. Call control processor 818 then directs base station 820 to page the remote station.

Data source 802 contains a quantity of data, which is to be transmitted to a given remote station. Data source 802 provides the data to packet network interface 806. Packet network interface 806 receives the data and routes the data to the selector element 816. Selector element 816 then transmits the data to each base station 820 in communication with the target remote station. In the exemplary embodiment, each base station 820 maintains a data queue 830, which stores the data to be transmitted to the remote station.

The data is transmitted in data packets from data queue 830 to channel element 826. In the exemplary embodiment, on the forward link, a "data packet" refers to a quantity of data which is a maximum of 1024 bits and a quantity of data to be transmitted to a destination remote station within a predetermined "time slot" (such as ≈1.667 msec). For each data packet, channel element 826 inserts the necessary control fields. In the exemplary embodiment, channel element 826 performs a Cyclic Redundancy Check, CRC, encoding of the data packet and control fields and inserts a set of code tail bits. The data packet, control fields, CRC parity bits, and code tail bits comprise a formatted packet. In the exemplary embodiment, channel element 826 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 828 which quadrature modulates, filters, and amplifies the signal. The forward link signal is transmitted over the air through an antenna to the forward link.

At the remote station, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 820, specifically the de-interleaving, decoding, and CRC check functions. The decoded data is provided to a data sink.

The hardware, as pointed out above, supports variable rate transmissions of data, messaging, voice, video, and other communications over the forward link. The rate of data transmitted from the data queue 830 varies to accommodate changes in signal strength and the noise environment at the remote station. Each of the remote stations preferably transmits a Data Rate Control, DRC, signal to an associated base station 820 at each time slot. The DRC signal provides information to the base station 820, which includes the identity of the remote station and the rate at which the remote station is to receive data from its associated data queue. Accordingly, circuitry at the remote station measures the signal strength and estimates the noise environment at the remote station to determine the rate information to be transmitted in the DRC signal.

The DRC signal transmitted by each remote station travels through a reverse link channel and is received at base station 820 through a receive antenna coupled to RF unit 828. In the exemplary embodiment, the DRC information is demodulated in channel element 826 and provided to a channel scheduler 812 located in the base station controller 810 or to a channel scheduler 832 located in the base station 820. In a first exemplary embodiment, the channel scheduler 832 is located in the base station 820. In an alternate embodiment, the channel scheduler 812 is located in the base station controller 810, and connects to all selector elements 816 within the base station controller 810.

In the first-mentioned exemplary embodiment, channel scheduler 832 receives information from data queue 830 indicating the amount of data queued up for each remote station, also called queue size. Channel scheduler 832 then performs scheduling based on DRC information and queue size for each remote station serviced by base station 820. If queue size is required for a scheduling algorithm used in the alternate embodiment, channel scheduler 812 may receive queue size information from selector element 816.

During the transmission of a packet to one or more users, the users transmit an "ACK" signal after each time slot containing a portion of the transmitted packet. The ACK signal transmitted by each user travels through a reverse link channel and is received at base station 820 through a receive antenna coupled to RF unit 828. In the exemplary embodiment, the ACK information is demodulated in channel element 826 and provided to a channel scheduler 812 located in the base station controller 810 or to a channel scheduler 832 located in the base station 820. In a first exemplary embodiment, the channel scheduler 832 is located in the base station 820. In an alternate embodiment, the channel scheduler 812 is located in the base station controller 810, and connects to all selector elements 816 within the base station controller 810.

Embodiments of the present invention are applicable to other hardware architectures, which can support variable rate transmissions. The present invention can be readily extended to cover variable rate transmissions on the reverse link. For example, instead of determining the rate of receiving data at the base station 820 based upon a DRC signal from remote stations, the base station 820 measures the strength of the signal received from the remote stations and estimates the noise environment to determine a rate of receiving data from the remote station. The base station 820 then transmits to each associated remote station the rate at which data is to be transmitted in the reverse link from the remote station. The base station 820 may then schedule transmissions on the reverse link based upon the different data rates on the reverse link in a manner similar to that described herein for the forward link.

Also, a base station 820 of the embodiment discussed above transmits to a selected one, or selected ones, of the remote stations to the exclusion of the remaining remote stations associated with the base station 820 using a Code Division-Multiple Access, CDMA, scheme. At any particular time, the base station 820 transmits to the selected one, or selected ones, of the remote station by using a code, which is assigned, to the receiving base station(s) 820. However, the present invention is also applicable to other systems employing different Time Division-Multiple Access, TDMA, methods for providing data to select base station(s) 820, to the exclusion of the other base stations 820, for allocating transmission resources optimally.

The channel scheduler 812 schedules the variable rate transmissions on the forward link. The channel scheduler 812 receives the queue size, which is indicative of the amount of data to transmit to a remote station, and messages from remote stations. The channel scheduler 812 preferably schedules data transmissions to achieve the system goal of maximum data throughput while conforming to a fairness constraint.

As shown in FIG. 1, remote stations are dispersed throughout the communication system and can be in communication with zero or one base station on the forward link. In the exemplary embodiment, channel scheduler 812 coordinates the forward link data transmissions over the entire communication system. A scheduling method and apparatus for high speed data transmission are described in detail in U.S. patent application Ser. No. 08/798,951, entitled "Method and Apparatus for Forward Link Rate Scheduling," filed Feb. 11, 1997, now U.S. Pat. No. 6,335,922, issued Jan. 1, 2002, to Tiedemann Jr. et al., assigned to the assignee of the present invention and hereby expressly incorporated by reference.

According to an embodiment, the channel scheduler 812 is implemented in a computer system, which includes a processor, Random Access Memory, RAM, and a program memory for storing instructions to be executed by the processor (not shown). The processor, RAM and program memory may be dedicated to the functions of the channel scheduler 812. In other embodiments, the processor, RAM and program memory may be part of a shared computing resource for performing additional functions at the base station controller 810. In the exemplary embodiment a generalized scheduler is applied to the system 800 illustrated in FIG. 7 and is detailed hereinbelow. Those modules within the BSC 810 and BS 820 used to implement a priority function for scheduling data transmissions is discussed after establishing the specifics of the generalized scheduler.

Given the growing demand for wireless data applications, the demand for very efficient wireless data communication systems has increased significantly. The IS-95 standard is capable of transmitting traffic data and voice data over the forward and reverse links. In accordance with the IS-95 standard, the traffic data or voice data is partitioned into code channel frames that are 20 milliseconds wide with data rates as high as 14.4 Kbps. In an IS-95 system, each subscriber station is allocated at least one of a limited number of orthogonal forward link channels. While the communication between a base station and a subscriber station is ongoing, the forward link channel remains allocated to the subscriber station. When data services are provided in an IS-95 system, a forward link channel remains allocated to a subscriber station even during times when there is no forward link data to be sent to the subscriber station.

A significant difference between voice services and data services is the fact that the former imposes stringent and fixed delay requirements. Typically, the overall one-way delay of speech frames are specified to be less than 100 milliseconds. In contrast, the data delay can become a variable parameter used to optimize the efficiency of the data communication system.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

Transmission delay required to transfer a data packet and the average throughput rate are two attributes used to define the quality and effectiveness of a data communication system. Transmission delay does not have the same impact in data communication as it does for voice communication, but it is an important metric for measuring the quality of the data communication system. The average throughput rate is a measure of the efficiency of the data transmission capability of the communication system. There is a need in the art for communication systems that provide improved data throughput while simultaneously providing a GOS that is appropriate for the types of service being provided over a wireless channel The need for a generalized scheduler is based on the requirements and targets of data transmission in a wireless system. For data transmissions, throughput is defined in terms of the delays incurred in the transmission of packets of data rather than in terms of individual bits or bytes. A data packet, such as an Internet Protocol, IP, datagram, is an indivisible unit as, in most cases, receipt of only a portion of a packet does not contain sufficient information for the user to decode and use the entire packet, i.e., the packet is useless to the end user. The end user receives the packet of data, performs a Cyclic Redundancy Check, CRC, on the packet of data, and processes the data. Therefore, the user is most concerned with the arrival time of the last bit of a packet and is not as concerned with the delay of individual bits in the data packet. This allows considerable flexibility in rate allocations to different users over time scales smaller than the transmission time of a data packet. Furthermore, in a Transmission Control Protocol, TCP, type connection, some variation of packets delays is acceptable as long as the variation is not so unpredictable that it causes TCP retransmissions needlessly.

Another feature of the wireless channel is the variability of the channel itself. In an HDR type system, this variability results in variations of the requested rate over a period of time. To maximize use of the channel, the scheduler is designed to serve high rate users, i.e., users requesting the highest data rates. This means that occasionally, the users may not be served for periods of time when their requested rates are lower. The overall throughput will be maximized when the scheduler does not serve low rate users for long periods of time. However, ideally the scheduler balances this against the desire for packet delays and delay variations to be relatively consistent as explained hereinabove.

Another aspect considers the fairness to the multiple users in a system. To accomplish a fair scheduling method, the scheduler ideally distributes the overall throughput among different users. Different bases of fairness (or allowable unfairness) are used by different systems to affect the needs and desires of the individual systems. The concept of fairness is a key concept in many scheduling algorithms. Fairness provides different amounts of flexibility in serving different users and hence has an impact on the overall throughput of a sector.

According to one embodiment, a method and apparatus for scheduling transmissions in a communication system with application to multiple classes of users incorporates a generalized scheduler. The generalized scheduler accommodates a variety of different scheduling priorities. Different classes of users each having specific transmission requirements are serviced by a generalized scheduler, which maintains a high throughput over all users.

In an exemplary embodiment, operation of a generalized scheduler implements a priority function of a channel condition metric and a fairness criteria, wherein the priority function is defined as:

$$f(A_i(t), U_i(t)), \quad (1)$$

wherein $A_i(t)$ is referred to as the channel condition metric and $U_i(t)$ is referred to as the user fairness metric. The function $A_i(t)$ specifies the desirability of serving user i at time t based on a current channel condition. The function $U_i(t)$ specifies the desirability of serving user i at time t based on the past history of received service. The priority function f( ) combines the two desirability metrics, $A_i(t)$ and $U_i(t)$, to determine a priority level for each user.

Figure 9A:
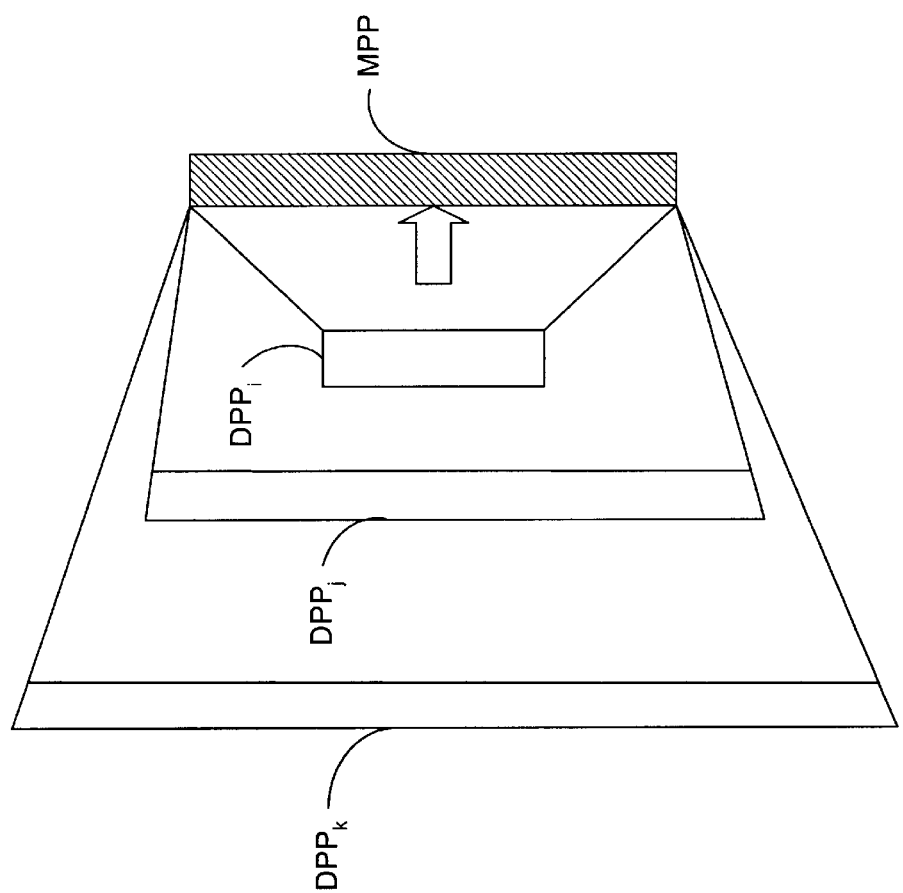
FIG. 9A illustrates a mapping of various delivery priority parameter ranges to a common mapped priority parameter range.

Referring to FIG. 9A, in an exemplary embodiment, multiple users each have a desired criteria for receiving transmissions from a same base station. The scale used for measuring the criteria is referred to herein as the Delivery Priority Parameter (DPP), wherein the DPP reflects the desired priority of each user. For example, a first user may desire to receive transmissions for a specified time allotment, while a second user may desire to receive transmissions of a specified throughput. Still a third user may desire to receive transmissions having a specified delay. The DPP of the first user reflects a time scale; the DPP of the second user reflects a bits per second (bps) scale, while the DPP of the third user reflects a time delay scale. The DPP of each user identifies the specific value of the desired criteria for receiving transmissions.

The DPPs of the multiple users are mapped to a common scale. The common scale is a unitless, proportional representation of the range of values within a DPP. As illustrated in FIG. 9A, each of the DPP may have a different range of values, wherein each of the different DPP ranges is mapped to a common scale. The mapping of the actual value of a specific user within a DPP range is referred to herein as the Mapped Priority Parameter (MPP).

Figure 9B:
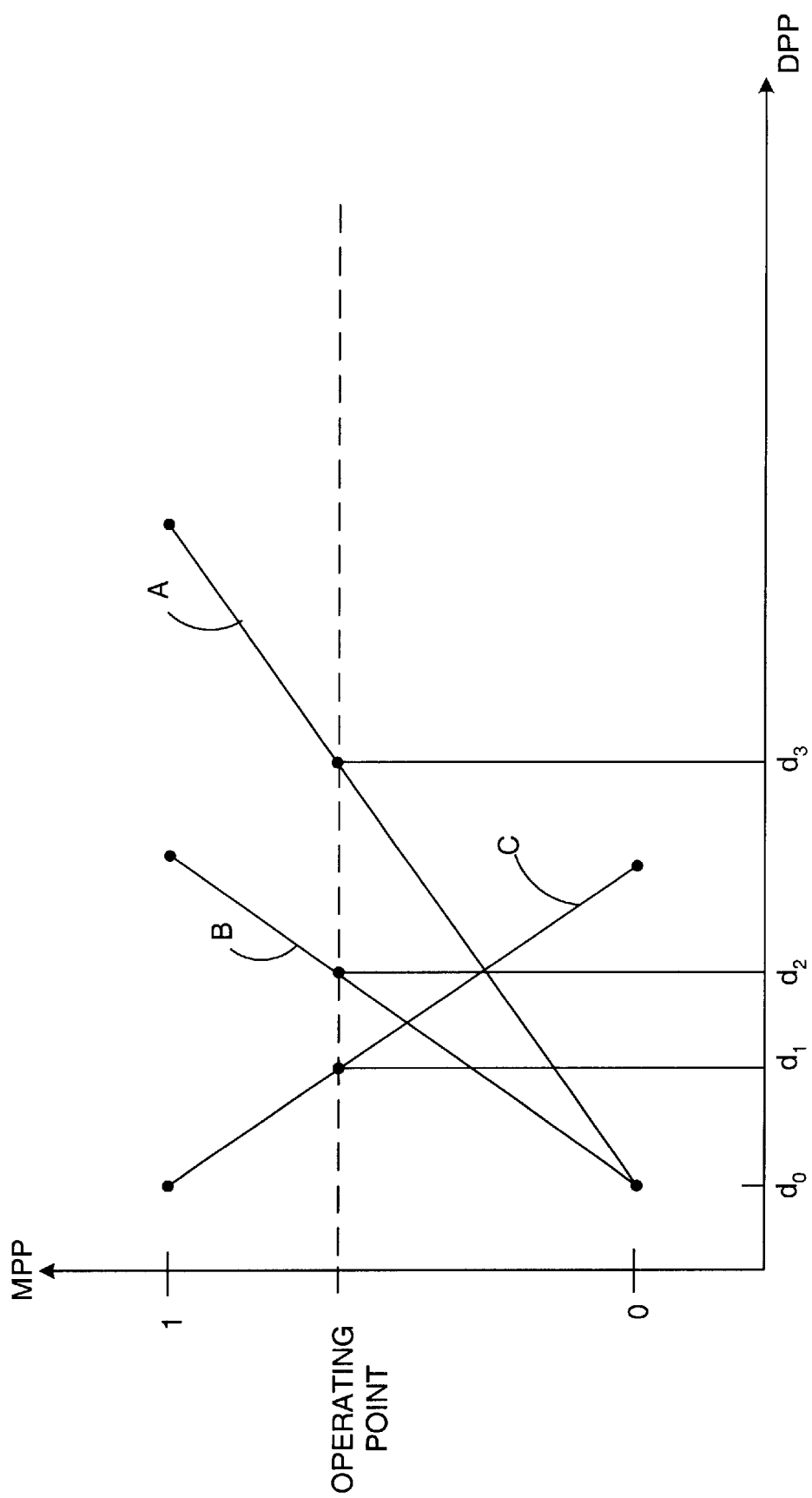

FIG. 9B illustrates a first DPP to MPP mapping scenario, wherein three different DPP types are labeled A, B and C. The horizontal axis represents the DPP ranges for each of the three types. The vertical axis represents MPP ranges of values. For clarity of understanding, in FIG. 9B the DPP type A represents a throughput parameter measured in bits per second; the DPP type B represents a time proportion parameter measured as a unitless ratio of time allocated to one user as a proportion of the total time allocated to all users; and the DPP type C represents a time delay proportion measured as a unitless ratio. Alternate embodiments may implement any type of DPP specific to a given system, additionally; alternate embodiments may include actual time units rather than the proportional values described in the examples herein. The ranges of values for a given DPP are provided over a predetermined range. For example, the range of values for DPP type A is from 0 bps to a maximum value supported by the system. Similarly, the range of values for the DPP type B is from 0 wherein the user receives no transmissions to a predetermined maximum wherein the user receives all of the transmission time. The range of values for the DPP type C is from no delay to a maximum delay.

The type A is an increasing function, wherein MPP=1 corresponds to a maximum value and MPP=0 corresponds to a minimum value. The type B is also an increasing function, wherein MPP=1 corresponds to a maximum value and MPP=0 corresponds to a minimum value. Note that the type C is a decreasing function, wherein MPP=1 corresponds to no delay and MPP=0 corresponds to a maximum delay. The MPP range reflects the minimum to maximum values of the DPPs. In other words, the MPP range unitizes the DPP ranges. Alternate mappings may be incorporated to provide a common basis of evaluation for the various DPPs. Continuing with FIG. 9B, an operating point is selected within the MPP range of 1 to 0. The operating point reflects the available resources to satisfy each of the users as reflected in the DPP ranges. The operating point defines the exact value of each DPP within the range provided. For example, the operating point defines a value of d3 for type A, a value of d2 for type B and a value of d1 for type C. These will be the operating points for the individual users having these DPPs. The values d1, d2, d3 are specific values within each of the ranges which are interpreted in light of the units of the corresponding DPP. The value d1 is interpreted in bps; the value d2 is interpreted as a proportion of time; and the value d3 is interpreted as a proportion of delay.

Figure 9C:
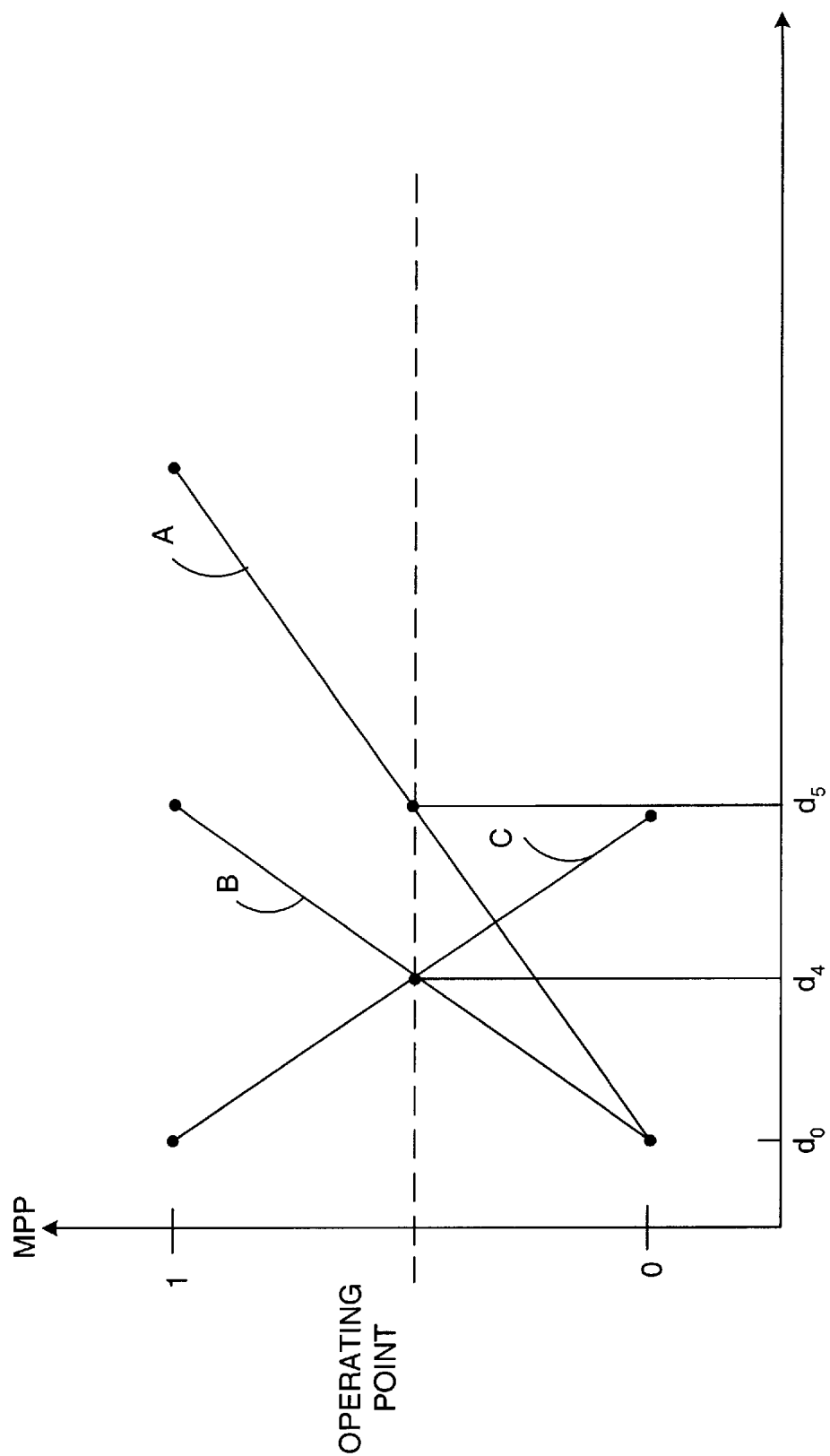

FIG. 9C illustrates the same DPP to MPP mapping wherein a different operating point is selected. The type B and type C DPPs result in a common value d4 and the type A results in a distinct value d5. FIG. 9D illustrates an alternate DPP to MPP mapping. Here the resultant function is a decreasing function; however, the function is not linear. The operating point defines a DPP value d6.

Figure 10:
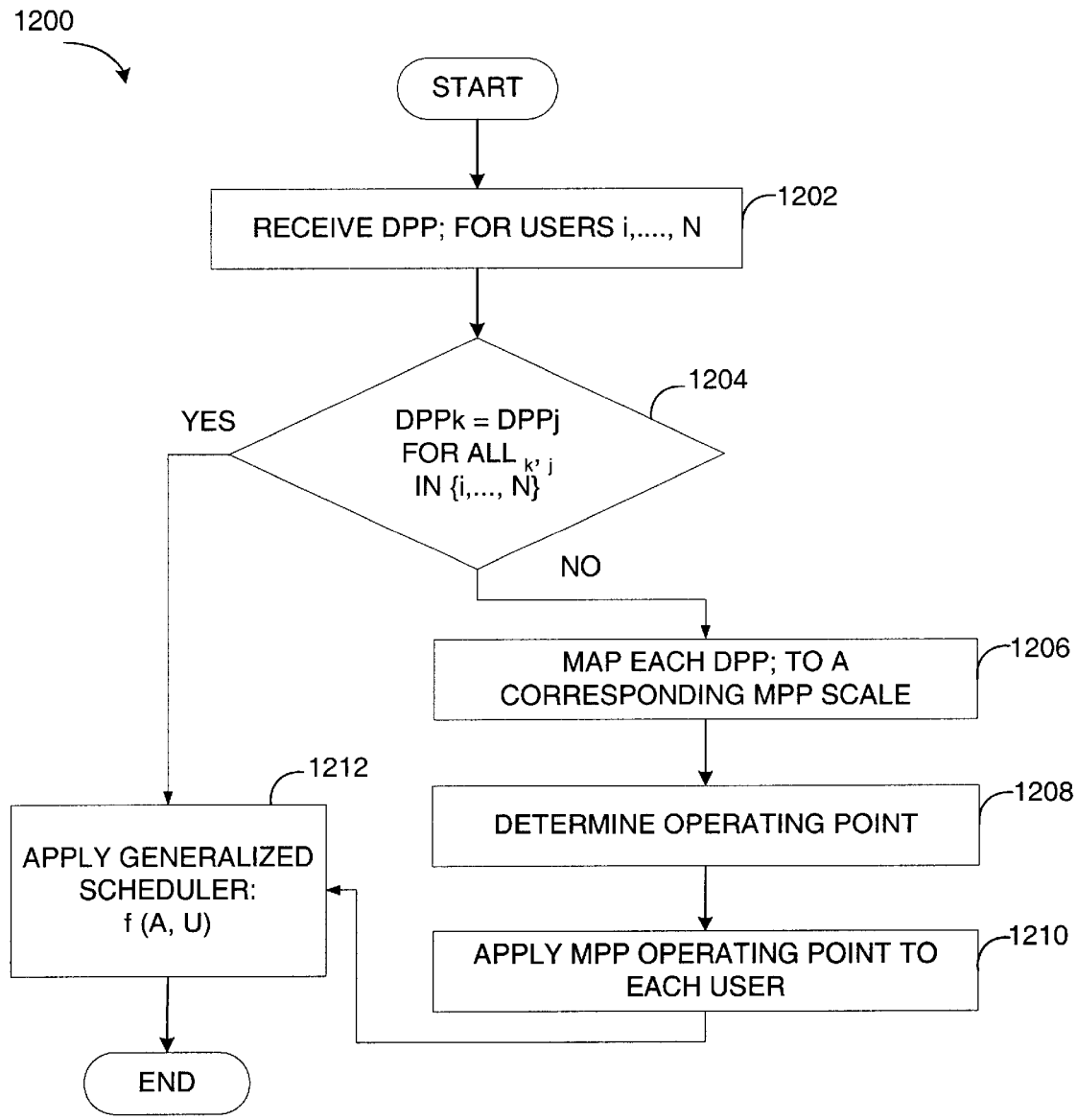
FIG. 10 illustrates a flow diagram of a generalized scheduler.

FIG. 10 illustrates a flow diagram of a generalized scheduler method 1200 according to one embodiment. At step 1202 the generalized scheduler receives DPP type information from each of N users. The DPP type information provides the generalized scheduler with information for determining an operating point among the N users. At decision diamond 1204 the generalized scheduler determines if the all of the DPP values are equal for all pairs of users, i.e. the absolute value without considering units. If all the DPP pairs have equal values, processing continues to step 1212 to apply the generalized scheduler defined by Equ. (1) hereinabove. If the DPP values are not all equal processing continues to step 1206 to map each DPP range to a corresponding MPP range, such as illustrated in FIGS. 9A–9D. At step 1208 the generalized scheduler determines an operating point supported by the available resources for each of the users. At step 1210 the process applies the operating point to each of the users determining the exact DPP value for continued operation. Processing then continues to step 1212 to apply the generalized scheduling algorithm defined by Equ. (1) hereinabove. In this way, the generalized scheduler applies a common MPP operating point to each user without regard to the individual DPPs. Once the MPP operating point is selected, the generalized scheduler extrapolates back to the exact DPP value within each DPP range. The users may therefore each request a different priority parameter, wherein the generalized scheduler applies a common scale to scheduling.

According to the exemplary embodiment, a generalized scheduler serves the user with the highest priority function $f(A_i(t), U_i(t))$ within a given class or type of users. In the exemplary embodiment, the value taken by the priority function $f(A_i(t), U_i(t))$ increases as the channel condition function $A_i(t)$ increases and decreases as the fairness function $U_i(t)$ increases. The functions $A_i(t)$ and $U_i(t)$ are determined accordingly. Further, the priority function f( ) is a function of at least one time period over which the channel condition metric and the user fairness metric are measured. In an alternate embodiment, the priority function f( ) may be a time-dependent per user function. However, for simplicity, it is best to stick with a combiner function that is common to all users and modify the user fairness metric to reflect the user requirements. Also, for clarity of discussion, consider the priority function as a division operation.

The channel condition metric takes advantage of variations in the channel condition. As discussed hereinbelow, this metric may be defined as DRC, DRC/DRCave, DRC-DRCave, or a constant value. To maximize the gains from multi-user diversity, the selected channel quality metric should have higher values when the channel condition is better relative to the average condition for that user. For clarity of discussion, the exemplary embodiment considers DRC/DRCave as the channel condition metric. Of particular importance is the definition of DRCave. The averaging should be done over a channel condition time constant, Tc. In this way, the channel condition metric is expected to change with the DRC over a time scale smaller than Tc. Changes in the DRC value that take place over time scales larger than Tc are considered long term, and affect both the numerator and the denominator of the channel condition metric equally and thus cancel each other out. The value of Tc is selected by looking at the channel dynamics. If the channel dynamics are such that the DRC values change significantly over time scales of length, say, T1, then the time constant Tc should be greater than T1. Note that the channel condition metric should use the largest time constant that is allowed by the user requirements.

According to the exemplary embodiment, the fairness metric is effectively kept constant per class of users. Given the selected channel condition metric, and the tendency for the channel condition metric to oscillate around 1, the scheduler will tend to serve a user that has a low user fairness metric value and will tend not to serve the user that has a high user fairness metric value. In this way, the generalized scheduler is similar to an algorithm that maintains the user fairness metric constant while taking advantage of the multi-user diversity. To determine a user fairness metric such that each user's most desired state leads to the same numerical value of the user-fairness metric, allows the system to serve users with many different types of requirements. Also the slope around the desirable point of operation will determine how excess capacity or capacity deficit is distributed among different users. The key insight into scheduling for different users is maintaining the user fairness metric at a constant value while taking advantage of multi-user diversity.

In a system that classifies users according to service, different classes of users are served according to a priority or other scheme, such as in a round robin fashion. First consider a single class or type of user. The exemplary embodiment uses the highest $f(A_i(t), U_i(t))$; however, alternate embodiments may use a lowest value and/or an alternate type function. Determination of an appropriate definition of f( ), $A_i(t)$ and $U_i(t)$ determines the effectiveness of the scheduling.

The present invention is applicable to a variety of scheduling algorithms and prioritizations, and is not limited to those described herein. For clarity, several scheduling algorithms will be discussed to provide examples of a generalized scheduler and various implementations.

Embodiments of the present invention are directed to a system and apparatus for allocating resources among a plurality of subscribers to a communication network which are serviced by a single communication node. At individual discrete transmission intervals, or "service intervals," individual subscribers utilize a finite resource of the communication node to the exclusion of all other subscribers. The individual subscribers are selected to utilize the finite resource based upon a weight or score associated with the individual subscribers. Changes in a weight associated with an individual subscriber are preferably based upon an instantaneous rate at which the individual subscriber is capable of consuming the finite resource.

In one embodiment, the AT 126 covers the DRC value with a DRC cover. The DRC cover is a coding applied to identify the sector from which the data is to be transmitted. In one embodiment, the DRC cover is a Walsh code applied to the DRC value, wherein a unique code corresponds to each sector in the Active Set of the AT 126. The Active Set, AS, consists of those sectors, with which AT 126 is currently transmitting and receiving information. The DRC value and DRC cover provide the complete data request, as the DRC value specifies a data rate and the DRC cover identifies a transmission sector. Alternate embodiments may use alternate covers or method of identifying a transmission sector. Still other embodiments may include the sector identification in the DRC value.

An example of a scheduler that can be implemented using the generalized scheduler framework is an equal time scheduler that improves system throughput by taking advantage of the multi-user diversity. The channel condition metric for this scheduler is DRC/DRCave described hereinabove. More specifically, at any time t, the scheduler computes the channel condition metric Ai(t) for each user i. Ai(t)=DRCi(t)/DRCavei(t) wherein DRCi(t) is the DRC signal received indicating the channel condition at time t, from user i, and DRCavei(t) is given by the following equation:

$$DRCavei(t) = DRCavei(t-1)(1-1/ta) + DRCi(t-1)(1/ta) \qquad (2)$$

wherein ta is the time constant for averaging.

The user requirement metric (Ui(t)) is given as fraci(t), wherein fraci(t) is defined using the following equation:

$$fraci(t) = fraci(t-1)(1-1/tu) + Servedi(t-1)(1/tu) \qquad (3)$$

The Served i(t−1) is 1 if user i is served during slot t−1 and is 0 if the user is not served during slot t−1. Note that fraci(t) is the average fraction of time spent serving user i where the averaging is done based on equation (2).

The scheduler then computes Ai(t)/Ui(t) for each user at each time slot t and among those users that have data to send, serves one that has the highest Ai(t)/Ui(t).

Another example of a scheduler that can be implemented using the generalized scheduler framework is an equal time scheduler that improves system throughput by taking advantage of the multi-user diversity, but also provides two different qualities of service to two different classes of users. One class, say class A, of users is sensitive to packet delays and hence the scheduler serves them with less jitter than another class, say class B. The channel condition metric for this scheduler is DRC/DRCave described hereinabove. More specifically, at any time t, the scheduler computes the channel condition metric $A_i(t)$ for each user i, as:

$$A_i(t)=DRC_i(t)/DRCave_i(t) \quad (4)$$

wherein $DRC_i(t)$ is the DRC signal received indicating the channel condition at time t, from user i, and $DRCave_i(t)$ is given by the following equation:

$$DRCave_i(t)=DRCave_i(t-1)(1-1/ta)+DRC(t-1)(1/ta) \quad (5)$$

wherein ta is the time constant for averaging.

The user requirement metric ($U_i(t)$) for users in class A is $frac_{ia}(t)$. where $frac_{ia}(t)$ is defined using the following equation:

$$frac_{ia}(t)=frac_{ia}(t-1)(1-1/tua)+Served_{ia}(t-1)(1/tua) \quad (6)$$

wherein $Served_{ia}(t-1)$ is 1 if user i of class A is served during slot t−1 and is 0 if the user is not served during slot t−1. Note that $frac_{ia}(t)$ is the average fraction of time spent serving user i wherein the averaging is done based on Equ. (5).

The user requirement metric ($U_i(t)$) for users in class B is $frac_{ib}(t)$. where $frac_{ib}(t)$ is defined using the following equation:

$$frac_{ib}(t)=frac_{ib}(t-1)(1-1/tub)+Served_{ib}(t-1)(1/tub) \quad (7)$$

wherein $Served_{ib}(t-1)$ is 1 if user i of class B is served during slot t−1 and is 0 if the user is not served during slot t−1. Note that $frac_{ib}(t)$ is the average fraction of time spent serving user i where the averaging is done based on equation (5). The scheduler computes $A_i(t)/U_i(t)$ for each user at each time slot t and among those users that have data to send, serves one that has the highest $A_i(t)/U_i(t)$.

In this case tua<tub, indicating that $U_i(t)$ of users in class A decays faster than the $U_i(t)$ of users in class B. As a result, users in class A get service more frequently than users in class B; however, each time users in class A get service, it is for a smaller amount of time. Overall, the scheduler spends an equal amount of time serving each user.

Another example of a scheduler that can be implemented using the generalized scheduler framework is the proportional-fair scheduler that improves system throughput by taking advantage of the multi-user diversity. The channel condition metric for this scheduler is DRC/DRCave described hereinabove. More specifically, at any time t, the scheduler computes the channel condition metric $A_i(t)$ for each user i as:

$$A_i(t)=DRC_i(t)/DRCave_i(t) \quad (8)$$

wherein $DRC_i(t)$ is the DRC signal received indicating the channel condition at time t, from user i, and $DRCave_i(t)$ is given by the following equation:

$$DRCave_i(t)=DRCave_i(t-1)(1-1/ta)+DRC_i(t-1)(1/ta) \quad (9)$$

wherein ta is the time constant for averaging. The user requirement metric ($U_i(t)$) is given as $ServedRateave_i(t)/DRCave_i(t)$ wherein $ServedRateave_i(t)$ is defined using the following equations:

$$ServedRateave_i(t) = \quad (10)$$
$$ServedRateave_i(t-1)(1-1/ta) + Served\_Rate(t-1)(1/ta)$$

wherein $Served\_Rate_i(t-1)$ is the rate at which user i is served during slot t−1 and is 0 if the user is not served during slot t−1. Note that $Served\_Rate_i(t)$ is the average data rate used for serving user i where the averaging is done based on Equ. (9).

Now the scheduler computes $A_i(t)/U_i(t)$ for each user at each time slot t and, among users with pending data to send, serves the user that has the highest $A_i(t)/U_i(t)$.

Yet, another example of a scheduler that can be implemented using the generalized scheduler method is the grade of service scheduler. The principle of the grade of service scheduler is to maintain a bit rate ratio between any two users to within a predetermined value G. The grade of service scheduler maintains the bit rate ratio requirement over a given time interval. This scheduler improves system throughput by taking advantage of the multi-user diversity over a short time interval. The channel condition metric for this scheduler is DRC/DRCave described hereinabove. More specifically, at any time t, the scheduler computes the channel condition metric $A_i(t)$ for each user i. $A_i(t)=DRC_i(t)/DRCave_i(t)$ where $DRC_i(t)$ is the DRC signal received indicating the channel condition at time t, from user i, and $DRCave_i(t)$ is given by the following equation:

$$DRCave_i(t)=DRCave_i(t-1)(1-1/ta)+DRC_i(t-1)(1/ta) \quad (11)$$

wherein ta is the time constant for averaging.

The user requirement metric ($U_i(t)$) is computed in the following manner. At each time slot, a measure of the overall system throughput, i.e., the sum of throughput of all users served by the base station, is stored and referred to as Rtotal. One possible way to keep track of Rtotal is by making the following computation at each time slot t.

$$Rtotal(t)=Rtotal(t-1)(1-1/ttotal)+SystemServedRate(t-1)(1/ttotal) \quad (12)$$

Wherein SystemServedRate(t−1) is the rate at which the system is serving any of its user at time t−1 and is 0 if no user is getting served at time t−1, wherein ttotal is a time constant appropriately chosen.

Also, a weight W is maintained for each user. When a packet of data having length B bytes is sent to a user, and the data rate of the user is smaller than Rtotal at the time the packet was sent, the weight W is incremented by B*G. The weight W is incremented by B after a B byte packet is sent to the user and the data rate of the user is greater than or equal to Rtotal at the time the packet was sent. Since the weight W changes with time, it is represented as W(t). Also, since each user has a different weight, we will use a subscript to identify the user it belongs to. Therefore, the weight of user j at time t is denoted by $W_j(t)$.

In addition there is parameter called a collar. The collar is a number specified as a scheduler parameter and does not change over time. Suppose Wmin(t) is the minimum weight among all users at time t The user requirement metric $U_i(t)$ is defined to be 1 for all users with weight between Wmin(t) and Wmin(t)+Collar. In one case, $U_i(t)$ is defined to be a large constant, say 1000, for all other users.

Next the scheduler computes $A_i(t)/U_i(t)$ for each user at each time slot t and, among those users that have pending data to send, serves the user having the highest $A_i(t)/U_i(t)$.

Figure 2:
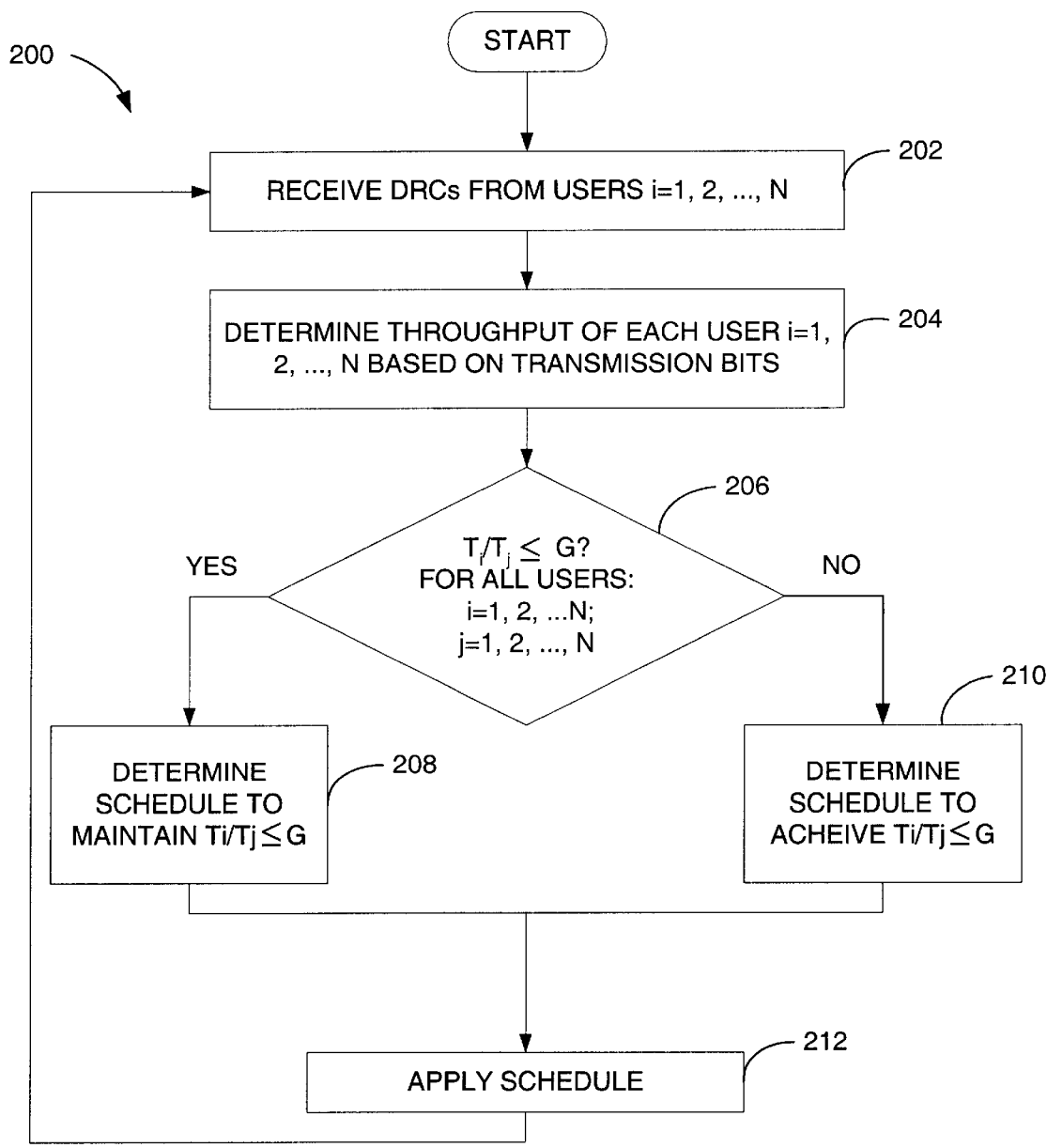
FIG. 2 is a flow diagram of a Grade Of Service, GOS, and algorithm for scheduling data transmissions in a wireless communication system.

As stated hereinabove, a variety of scheduling algorithms may be used to schedule transmissions in a system supporting data transmissions, such as an HDR system. One method is referred to as a Grade Of Service, GOS, scheduling algorithm. FIG. 2 illustrates a GOS scheduler applicable to system 100 of FIG. 1, wherein each active user or Mobile Station, MS, sends a data rate request to a Base Station, BS. The GOS scheduler provides a method of selecting users for data transmissions which maintains a rate ratio between any pair of two users and thus satisfies a corresponding fairness criteria. In other words, the fairness criteria for the GOS scheduler ensures that the throughput of each user is in proportion to each of the other users.

The scheduler method 200 is performed at the BS and considers a set of active users, wherein a user is a member of the active set when there is data pending for a communication between that user and the BS. The total number of active users is given as N, and the index i identifies individual members of the active set. For data transmissions, each of the N users in the active set instructs the BS to transmit data a data rate desired by the user. The data rate information is provided as a data rate request message. In one embodiment, the data rate request is a Data Rate Control, DRC, message. The data rate request message indicates the Forward Link, FL, quality.

Continuing with FIG. 2, at step 202 each of the N users transmits a DRC value. At step 204 the BS determines the throughput of each of the N users based on the number of bits transmitted. The BS transmits to each of the N users and therefore has knowledge of the number of transmission bits that are sent to each user during a given time period. The throughput of user i is given as Ti. A second index j is used to identify users for comparison to user i. At decision diamond 206 the BS determines a ratio of the throughput of user i to user j for all users in the active set. The ratio is then compared to a fairness criteria proportional value, G,:

$$\frac{T_i}{T_j} \le G, \text{ for all } i \text{ and } j. \tag{13}$$

Note that as given in Equ. (13), throughput increases as G increases. The increased throughput is at the expense of fairness, as higher G values allow greater differences in throughput of different users. Fairness in this sense refers to the actual number of bits transmitted to a given user. If the ratio of Equ. (13) does not satisfy the equation for any combination of users i and j, at step 210 the BS determines a schedule to achieve or approximately achieve the relationship of Equ. (13). In this case, the BS will typically increase the transmissions to users having low throughput values. In this way, the ratio of user(s) having the lowest throughput to user(s) having the highest throughput is reduced. If the Equ. (13) is satisfied at decision diamond 206, the BS determines a schedule to maintain the throughput ratios approximately below or equal to G at step 208. The schedule is applied at step 212 and processing returns to step 202 to receive the next set of data rate request messages, e.g. DRCs.

Figure 3:
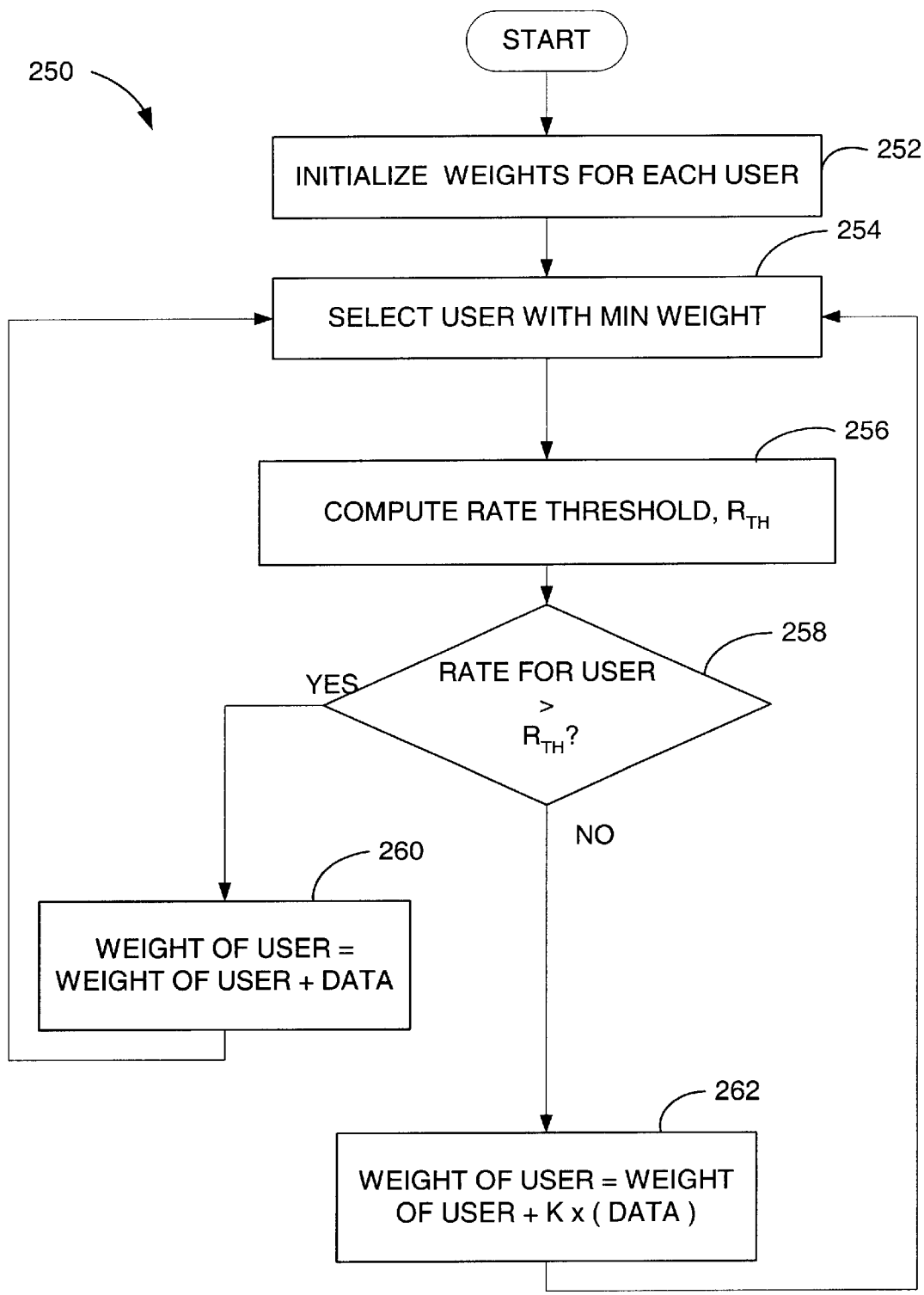
FIG. 3 is a flow diagram of a scheduling algorithm for data transmissions in a wireless communication system.

Another scheduling algorithm that is applicable to system 100 is illustrated in FIG. 3. Scheduling method 250 initializes weights for each user at step 252. A weight is a priority indicator wherein greater weight signifies importance of a user's transmission. Alternate embodiments may implement a different significance for the weights. The weight may be determined by a variety of factors, including, but not limited to, a service plan selected by the user. At step 254 the BS selects the user having the minimum weight. The BS computes a rate threshold Rth value at step 256 and compares the Rth to the rate of the selected user at decision diamond 258. The BS computes the rate threshold as an average of all of the instantaneous rates associated with users having data. The instantaneous rates associated with users, which do not include data, are preferably eliminated for this calculation. The BS compares the rate threshold Rth to the rate of the selected user and if the user rate exceeds the threshold Rth, at step 260 the BS increments the weight associated with this user by a lower value which is preferably a number representing the quantity of data to be transmitted during the subsequent service interval in units such as bits, bytes or megabytes. If the user rate does not exceed the threshold Rth, step 262 increments the weight of user by a higher value which is preferably a multiple "K" of the quantity of data which is to be transmitted during the subsequent service interval such as number bits, bytes or megabyte quantities.

The selection of K is preferably based upon a fairness criteria which favors the allocation of service intervals to remote stations or users having the capacity to receive data at higher rates. The system designer selects the size of K based upon the extent to which remote stations receiving data at the higher rates are to be favored over the slower receiving remote stations. The larger the value of K, the more efficiently the forward link of the BS is utilized. This efficiency, however, comes at the cost of depriving the subscribers of the slower receiving user of the transmission resources of the forward link. The system designer therefore preferably selects the value of K in a manner which balances the two competing objectives of 1) enhancing the overall efficiency of the forward link and 2) preventing acute deprivation of the slower receiving users. Selected users having a faster associated instantaneous data rate (i.e., exceeding the threshold Rth) will tend to have the associated weight incremented by only a small amount, while selected users having a lower data rate (i.e., not exceeding the threshold Rth) will have the associated weight incremented by a significantly greater amount. The method 250 of FIG. 3 tends to favor servicing users, which receive data at relatively faster rates over those remote stations receiving data at lower data rates. This tendency enhances the throughput efficiency of the BS in transmitting data in the forward link; however, as the weights associated with the often selected queues associated with the users having the higher rates of receiving data (i.e., exceeding the threshold Rth) continue to be incremented, these weights eventually approach the weights of the queues associated with the less often selected queues associated with the users having the slower rates of receiving data (i.e., not exceeding the threshold). The selection process will then begin to favor the slower receiving users as the weights of the faster receiving users begin to exceed the weights of the slower receiving users. This imposes a fairness restraint on the selection process by preventing the faster receiving users from dominating the forward link transmission resources of the base station to the exclusion of the slower receiving users.

Still another scheduling method is referred to as a proportional-fair scheduler, having a fairness criteria that seeks to equalize transmission time over all users in the active set. According to a proportional-fair scheduling method the BS tracks a parameter associated with each user i as a function of time, such as data rate, $R_i(t)$. The BS receives the DRC information from each user in the active set and calculates a ratio of:

$$DRCi/Ri \tag{14}$$

for each user in the active set. The ratio effectively compares a current channel condition to the recent past. For a given user, if the DRC is high while the parameter R is low, the user is considered a good candidate for transmission. The reduced R value indicates that the user has not been the recipient of data transmissions from the base station in the recent past. The high DRC indicates that the user has detected a good channel condition. According to one embodiment, the calculation of the user parameter R is given as:

$$R_i(t+1) = R_i(t) * \left(1 - \frac{1}{T_c}\right) + D * \left(\frac{1}{T_c}\right) \quad (15)$$

wherein D represents the data rate received during a predetermined time interval t, and $T_c$ represents the recent interval considered. Recent data rates are weighted more heavily to reflect the actual condition for each user.

Figure 4A:
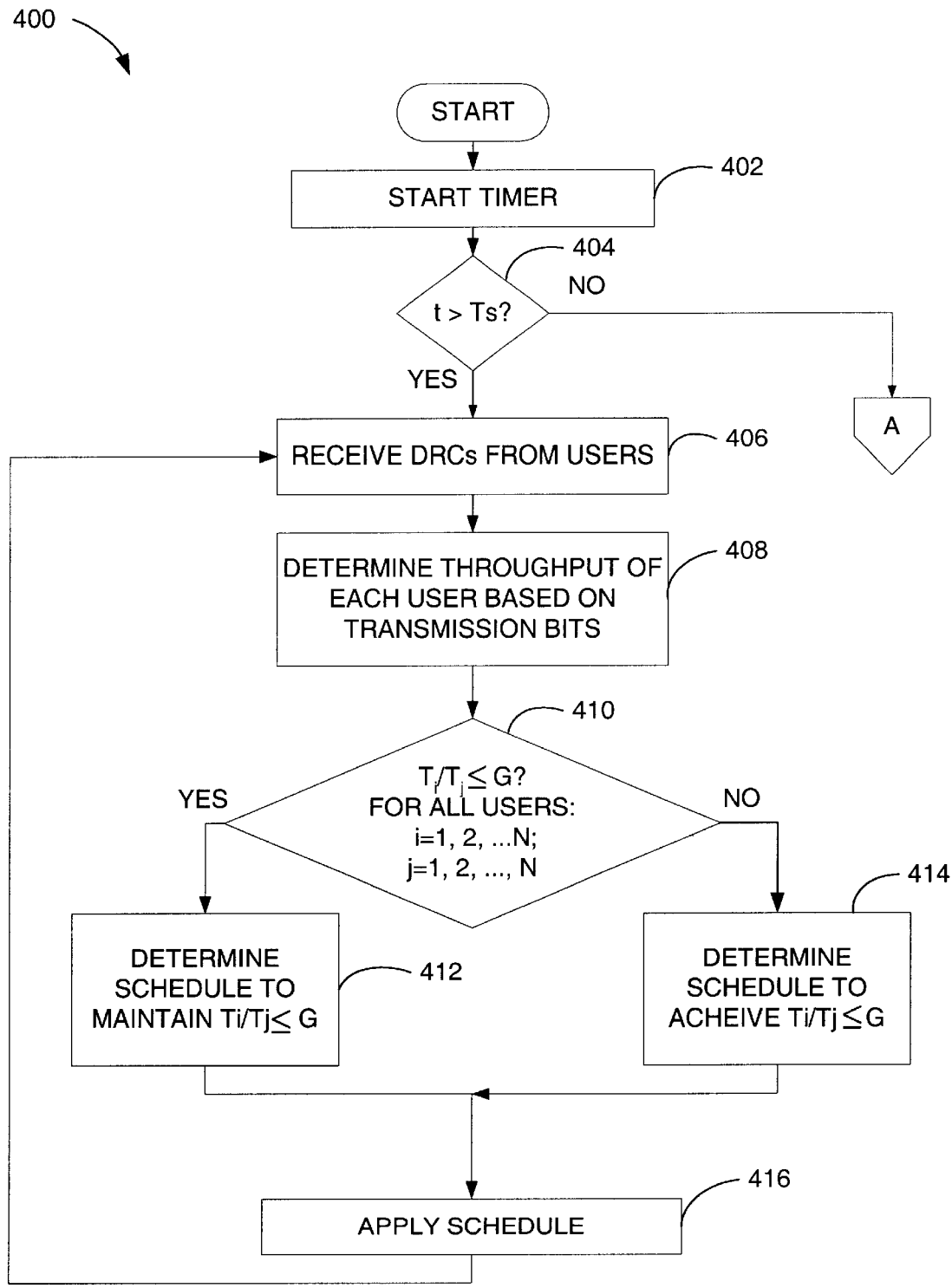
FIGS. 4A and 4B are flow diagrams of a proportional-fair algorithm for scheduling data transmissions in a wireless communication system.

FIG. 4A illustrates a combination of methods described hereinabove, wherein a data rate threshold is applied to instantaneous values within a predetermined time period, and a GOS criteria is applied over an interval defined by the predetermined time period. The method 400 first initializes a timer at step 402 to track the GOS time period. If the timer has not expired at step 404, i.e., still within the GOS time period, processing continues to step 420 of FIG. 4B to determine a priority function for each user. In the exemplary embodiment, the priority function is the data rate of the user, Ri(t). At step 422 the BS selects a winner according to the priority function and transmits data at step 424. If data is still pending at step 426 processing returns to step 420, else processing ends for this time period.

Continuing with FIG. 4A, if the timer has expired at step 404, i.e., the GOS time period is complete, processing continues to step 406 to receive DRC(s) from other user(s). At step 408 the BS determines the throughput of each user based on the number of bits transmitted. The ratio is then compared to the fairness criteria proportional value, G, as given in (15) hereinabove. If the ratio of Equ. (13) does not satisfy the equation for any combination of users i and j, at step 414 the BS determines a schedule to achieve or approximately achieve the relationship of Equ. (13). In this case, the BS will typically increase the transmissions to users having low throughput values. In this way, the ratio of user(s) having the lowest throughput to user(s) having the highest throughput is reduced. If the Equ. (13) is satisfied at decision diamond 410, the BS determines a schedule to maintain the throughput ratios approximately below or equal to G at step 412. The schedule is applied at step 416 and processing returns to step 402 to receive the next set of data rate request messages, e.g. DRCs.

Figure 4B:
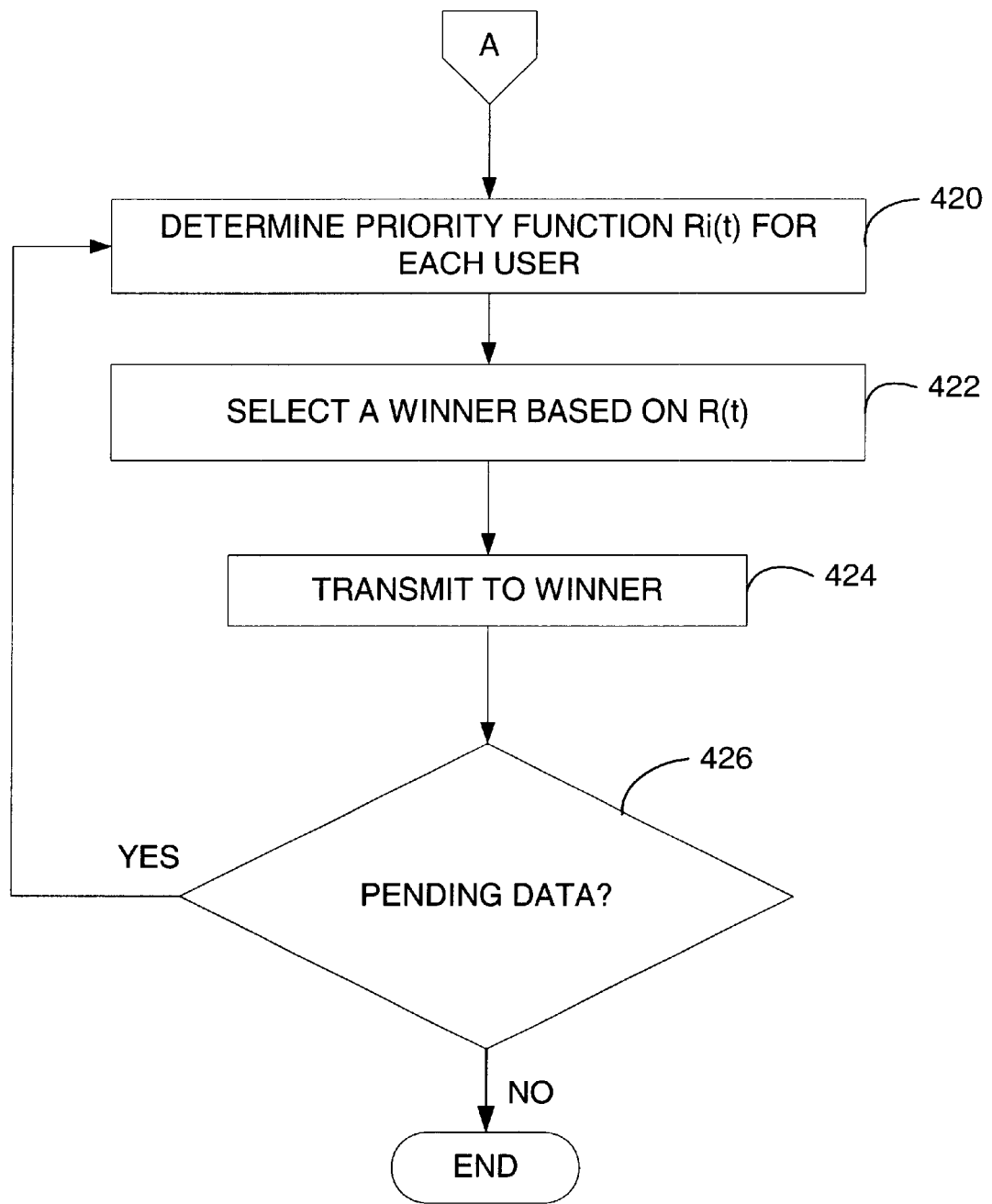
Figure 5:
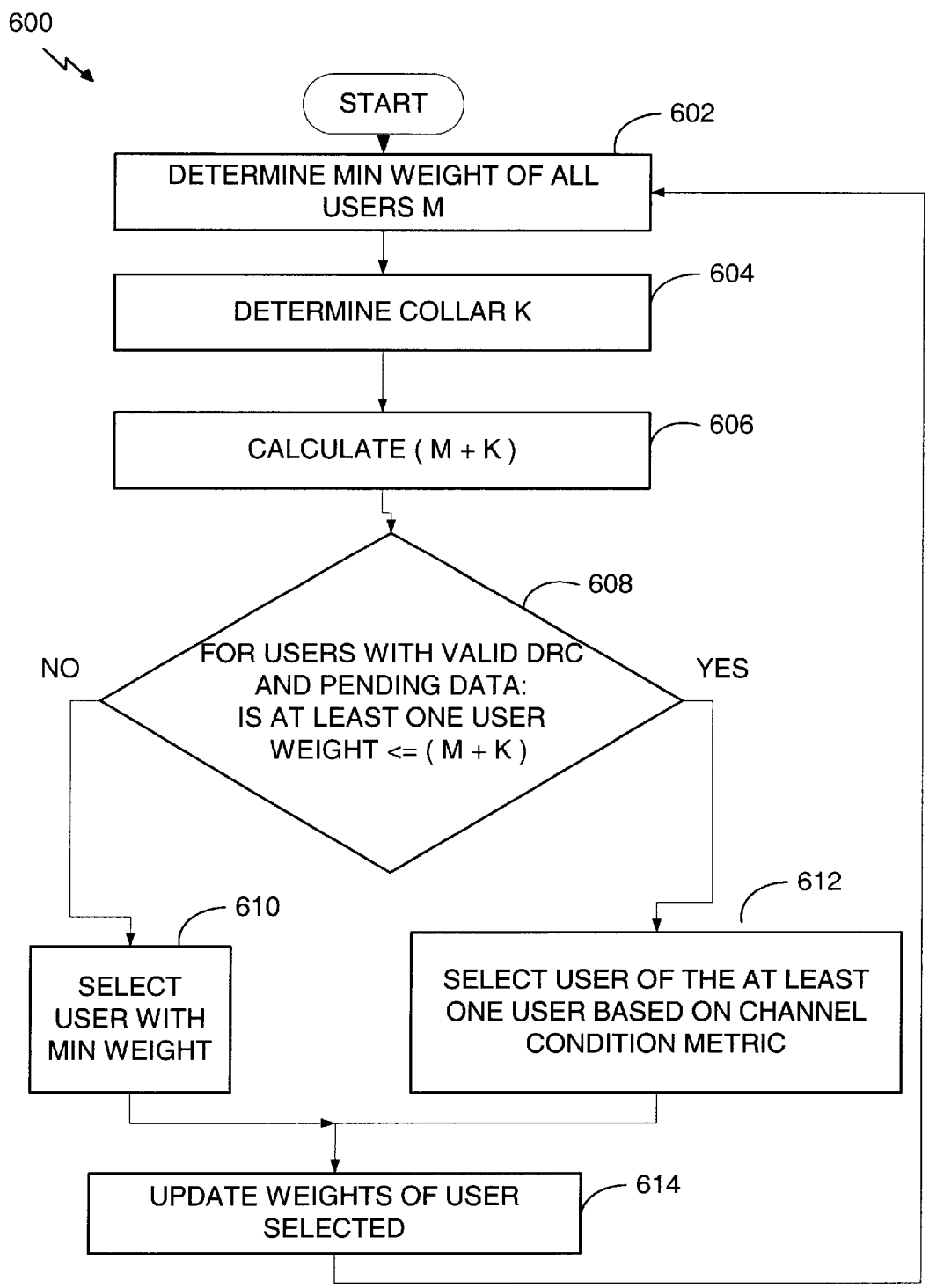
FIG. 5 is a flow diagram of a combination scheduling algorithm, implementing a proportional-fair algorithm and a GOS algorithm in a wireless communication system.

A specific example of the method 400 illustrated in FIGS. 4A and 4B is provided in FIG. 5. The method 600 first determines the minimum weight among M users at step 602. The method 600 further determines a collar K for the selected user at step 604 and calculates (M+K) at step 606. For those users transmitting a valid DRC and having pending data, if the weight of a user at decision diamond 608 is much less than the calculated value of (M+K), processing continues to step 612 to select a user based on channel condition. Else, processing continues to step 610 to select user having the minimum weight. The weight of the selected user is updated at step 614 and processing returns to step 602.

One scheduling algorithm originally proposed for the forward link in an HDR system provides a Grade Of Service fairness over as small a time period as allowed by the granularity of HDR encoder packets. The grade of service fairness is defined to mean that the throughput seen by two users over some period of time should be different from each other by no more than a ratio of G:1, where G>=1. Another way to describe the same thing is to say that the over an arbitrary time period of length t, $$b_A(t) \leq G * b_B(t) \forall A, B \quad (16)$$

wherein $b_A(t)$ and $b_B(t)$ are the number of bits received by users A and B respectively over the time period of length t. A GOS scheduling algorithm first initializes all of the weights associated with the queues to a nominal weight value of zero. The algorithm then selects a queue for transmission and sends packet from the selected queue. All of the weights are then updated for all queues. The algorithm then selects a next queue for transmission.

The selected queue is initialized to no entries and given a weight of negative infinity. The process then considers a next queue and checks to see if there is sufficient time for the next queue to complete a data packet transmission before the control channel transmission is scheduled to begin. If there is insufficient time, the process checks another queue. This process continues until a queue is found that will be able to complete a transmission in the time available. The algorithm compares the current queue weight to the weight of the selected queue. If the current queue weight is less than the weight of the selected queue the algorithm selects the current queue and stores the weight in memory. Else, if the current queue weight is equal to the weight of the selected queue, the algorithm performs the following checks: (a) Can the current queue use at least as much of the current slot as the selected queue? and (b) Can the current queue's remote station receive at a higher rate than the selected queue rate? If the answer to both is yes, the algorithm selects the current queue and stores the associated weight in memory. The process is repeated for all of the queues. If no data is pending, there will be no selected queue at this point.

The proportional-fair algorithm causes the throughput of sector to increase as the number of active user increases. The GoS algorithm does not have this property. This difference is caused by the time scale over which fairness is maintained. The Proportional-fair scheme does not guarantee fairness over time scales shorter than the time constant of the average throughput calculator. As a result, it has the flexibility to rearrange transmissions to different users over short time periods to take advantage of the variations in channel conditions. As long as these time periods are short enough that packet delays are not significantly affected.

However, the proportional-fair algorithm also changes the notion of fairness from the grade of service scheduler. Hence, in the worst case the ratio of bit rates to individual users may be as large as the largest ratio of requested rates (64:1 for one embodiment of an HDR system). This may be undesirable. It is desirable to take advantage of the channel variation over short term to increase throughput but maintain the grade of service fairness over longer periods of time.

As discussed hereinabove, schedulers based on a GoS concept of fairness generally ensures that Equ. (16) is satisfied over all time intervals. Modification of Equ. (16) to include a constant value C results in the following expression:

$$b_A(t) \leq G * b_B(t) + C \forall A, B. \quad (17)$$

Over extended time intervals, i.e., large values of t, the number of bits transmitted during the intervals $b_A(t)$ and $b_B(t)$ will be very large compared to C. In the limit as t goes to infinity, the new rule reduces to the old rule. This provides grade of service fairness over long time period. Over short time periods, however, the number of bits sent to users A and B may have any ratio. Thus by choosing C carefully, the system may be designed to determine which time periods are considered short and which time periods are considered long. This allows the freedom to violate the GoS fairness criterion over short time periods, and therefore the system is free use any scheme to maximize throughput. The modified algorithms discussed herein differ from each other in how each one optimizes performance by taking advantage of this freedom and additionally how each one determines the value of C.

Alternate scheduling algorithms performing in a similar manner to the GoS algorithm described hereinabove, however, may differ depending on implementation of the user selection process by the introduction of the parameter or constant value C into the selection procedure. As described hereinabove, in one embodiment, the GoS algorithm selects among users having valid DRC messages, the one having the minimum weight, identified by a variable M. In an alternate embodiment, the scheduling algorithm selects a user having a weight within a range defined by the constant value C around the minimum weight user, i.e. range is defined as M+C. In other words, the algorithm implements a margin with respect to the minimum weight. A set of users may be determined having weights within the defined range, i.e., range of weights defined by (M+C). The selection process within the range may be based on another criteria, including, but not limited to, the data rate requested, such as DRC value, or a function thereof. Various embodiments may implement similar scheduling methods, wherein individual scheduling schemes may differ as to the method used for selection of a user from this set. The minimum weight user is the user having the minimum weight in the set of all active users, including active user without pending data and active users with invalid DRC messages. Hence, it is possible that no user in this set has data pending and a valid DRC, wherein the user having the minimum weight among the rest of the users is picked for transmission, i.e., users in the active set with weights greater than (M+C) but with pending data and a valid DRC.

Figure 8:
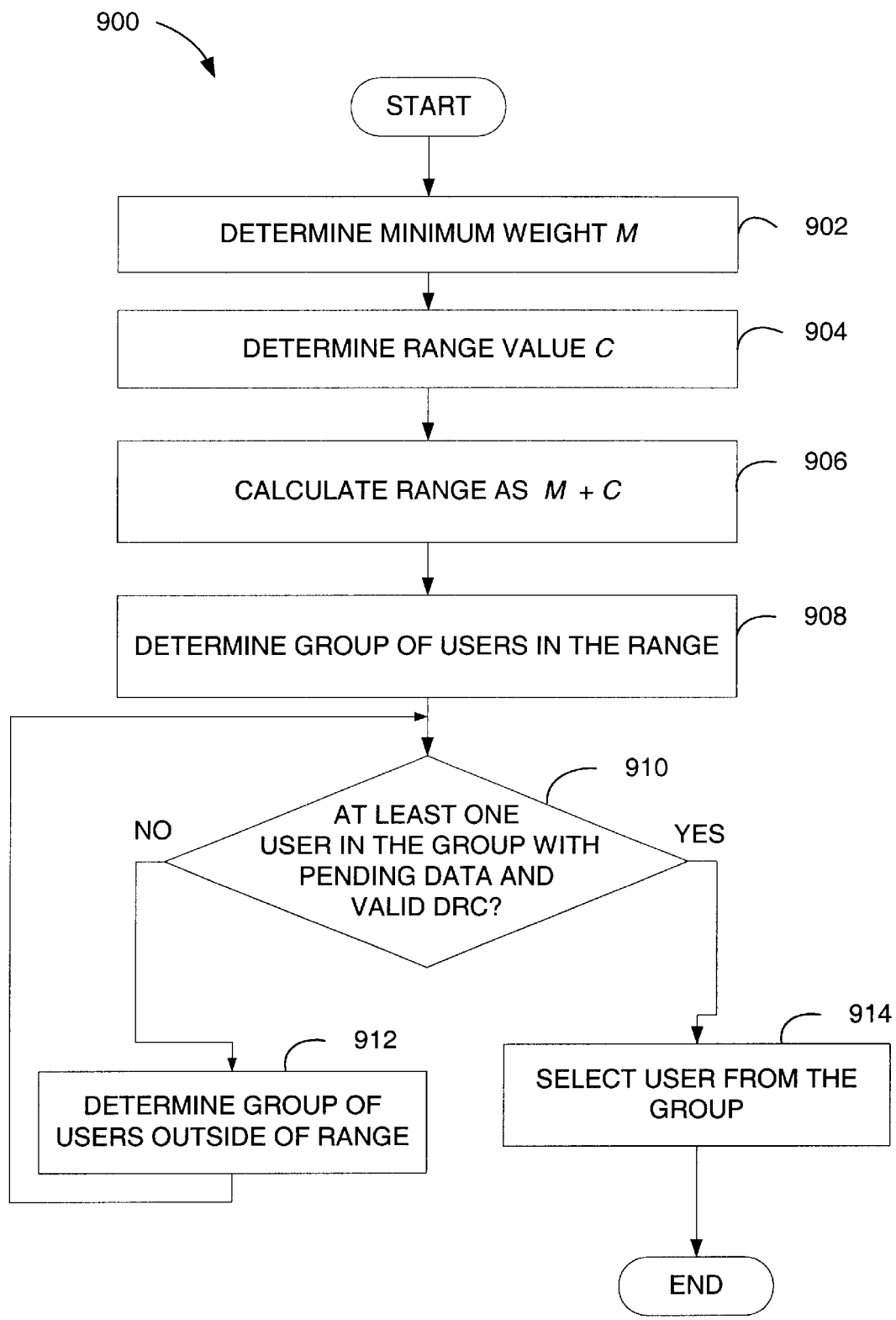
FIG. 8 is a flow diagram of a scheduling algorithm for a wireless communication system.

FIG. 8 illustrates a scheduling algorithm 900 according to one embodiment, wherein the method determines a minimum weight M of the users, or queues, at step 902. A range value C is determined at step 904, wherein the value is used to define a range of weights within which an alternate selection criteria may be used. At step 906 the method calculates the range as M+C, and determines a group of users in the range at step 908. If at least one user in the group as in diamond decision 910 has data pending and valid DRC message, processing continues to step 914 to select a next user from the group. If no user in the group has data pending and valid DRC message, the group is defined as the users not included in the group defined by the range of M+C. In other words, the group is redefined as the set of users having weights greater than M+C at step 912 and processing returns to 908. If at least one user in the group has pending data and valid DRC message, processing continues to step 914 to select the next user from the group. Note that if no user in the active set has data pending and valid DRC then no transmission is processed. The criteria used to select a user or queue from the group may be referred to as desirability metric.

In one embodiment, the value C is a constant, irrespective of the number of users. Similar to a proportional-fair type algorithm, a filtered version of average throughput to each user is implemented as a desirability metric. For example, according to one embodiment the desirability metric is defined as the current requested data rate minus an average throughput value for a given user.

According to an alternate embodiment, C is a constant and the desirability metric is equal to the current requested data rate. This method is referred to as a modified GoS algorithm applying a high DRC value.

According to still another embodiment, C is a constant, and a filtered version of the average throughput to each user is maintained as in a proportional-fair type algorithm. In this embodiment, the desirability metric is set equal to the current requested data rate divided by the average throughput.

In yet another embodiment, the value of C is proportional to (1/Number of active users). A filtered version of the average throughput to each user is maintained in a way identical to the proportional-fair scheme and the desirability metric is set equal to a current requested data rate divided by the average throughput.

In one embodiment, a scheduling algorithm controls the channel scheduler 812 of FIG. 7 for scheduling transmissions from the base station 820 to the remote stations. As discussed hereinabove, a data queue 830 is associated with each remote station. The channel scheduler 812 assigns each data queue 830 a "weight" which is evaluated for selecting a particular remote station associated with the base station 820 to receive data in a subsequent service interval. The channel scheduler 812 selects individual remote stations to receive a data transmission in discrete service intervals. The channel scheduler first initializes the weight for each queue associated with the base station 820.

A channel scheduler 812 cycles through a series of during a transmission intervals or service intervals. The channel scheduler 812 determines whether there are any additional queues to be added due to the association of an additional remote station 6 with the base station 820 detected in the previous service interval. The channel scheduler 812 also initializes the weights associated with the new queues. As discussed hereinabove, the base station 820 receives the DRC signal from each remote station associated therewith at regular intervals such as time slots.

Figure 6:
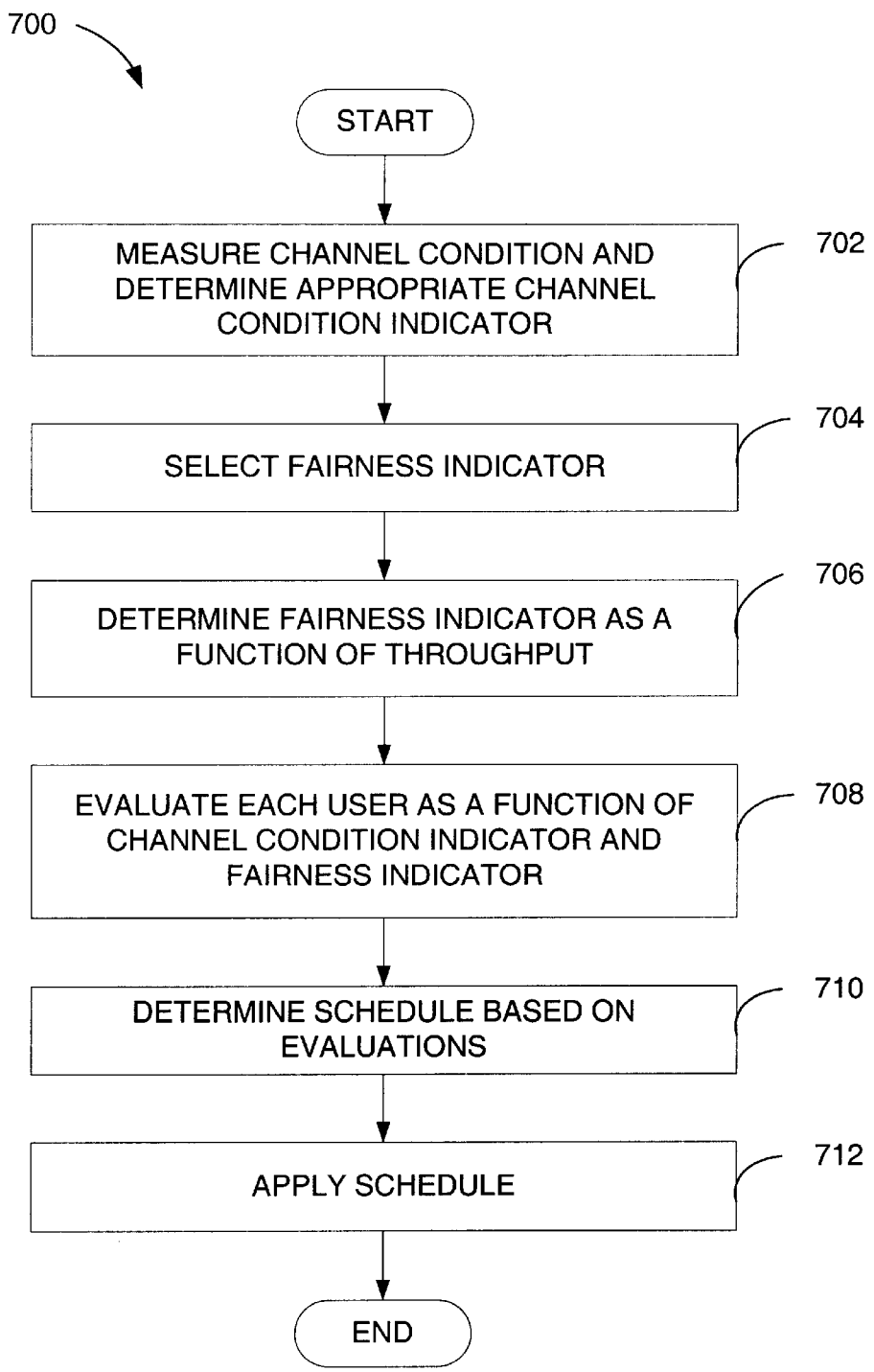
FIG. 6 is a flow diagram of a generalized scheduler for a wireless communication system.

The exemplary embodiment of the present invention is applicable to a variety of scheduling algorithms and effective to achieve a variety of fairness criteria. FIG. 6 illustrates the scheduling method 700 of the exemplary embodiment that first evaluates the channel condition and prepares a channel condition indicator at step 702. A fairness indicator is selected at step 704. The fairness indicator is a metric used to evaluate the fairness of the scheduling method implemented. The desire is to optimize the resources of the system by maximizing throughput without causing delays to users having either very little data pending or poor channel conditions. In addition, the method provides service according to the class of each user. Fairness criteria include, but are not limited to, the following types: 1) a proportionally fair method as a function of channel condition and throughput; 2) a Packet-by-packet Generalized Processor Sharing (PGPS) method as a function of throughput and user priority; 3) an equal time method as a function of service time; 4) a GOS method as a function of throughput; and 5) a service time method as a function of wait time and deadline for completion.

Continuing with FIG. 6, at step 706 the method 700 determines a fairness indicator value as a function of throughput. At step 708 each user is evaluated as a function of channel condition indicator and fairness indicator. At step 710, a schedule is determined based on the evaluations of step 708 and the schedule is applied at step 712. According to the exemplary embodiment, a variety of methods are available for channel condition evaluation, and, therefore, multiple combinations of channel condition indicator and fairness indicator are available for use in scheduling.

FIG. 7 illustrates a system 800 including a Base Station Controller, BSC, portion 810 and a BS portion 820 in communication with a network. The network includes a data source 802 and a data sink 804, each communicating with a packet network interface 806. Further, the network may include a Public Switched Telephone Network, PSTN, 808. The BSC 810 includes a channel scheduler 812, a fairness selector 814, a selector element 816, and a call control processor 818. The packet network interface 806 is coupled to the selector element 816 and the call control processor 818. The call control processor 818 affects changes in the active set of users within system 800. The selector element 816 determines the target participant(s) to a communication and makes appropriate connection. The selector element 816 is also coupled to BS 820. The fairness selector 814 allows the BSC 810 to implement a desired fairness criteria and provide the information to the channel scheduler 812. The fairness selector 814 may also receive a fairness indicator designation from the BS 820.

The BS 820 includes a channel scheduler 832, which provides information to a channel element 826 with the selected user for a next data transmission. The BS 820 further includes a data queue 830, an RF unit 828, a fairness selector 824, and a Control Unit 822. The fairness selectors 814, 824 may implement the method 700 as illustrated in FIG. 6.

As discussed hereinabove, the exemplary embodiment allows multiple users to be classified according to a priority scheme or other scheme. Consider a system supporting two sets of users. The first set has a delay requirement and the second set simply requires a best effort service. The delay requirement of the first set indicates that transmissions occur with less than a predetermined delay and is therefore a higher priority set than the second set. In the exemplary embodiment, the user i is a member of the first set. User i specifies the packet delays for transmissions on the forward link, or downlink, be less than a predetermined delay $d_i$ wherein the user i will implement the delay with a predetermined level of flexibility $f_i$. The second set of users is provided access to slots in an equal time manner. For scheduling the first and second sets of users, the desired scheduler will provide multi-user diversity while satisfying the requirements of each of the different users in a different manner. For clarity of example, the channel condition metric is not changed.

The first step is to determine an appropriate user fairness metric, wherein the user fairness metric is described by a function that is different for the two classes of users. A further constraint is that both the first and second sets result in a same numerical value at a desired point of operation. For example, consider the user fairness metric defined as:

$$U_i(t) = \frac{d_i + f_i - W_i(t)}{f_i} \tag{18}$$

wherein $W_i(t)$ is the delay suffered by the data packet that has been waiting the longest time at time t in user i's queue of pending data. This function has the property that it takes value one when the delay of the packet is $d_i$ but goes to zero when the delay reaches $d_i+f_i$. The goal is to maintain the delay at $d_i$ but allow it to go as high as $d_i+f_i$, i.e., stay within a range of the desired delay.

For the second set of users, the exemplary embodiment provides a best effort with respect to the data packet delays by providing equal time scheduling to all users. To achieve the equal time scheduling, the method may use a user fairness metric such as:

$$U_i(t) = n^* \text{frac}_i(t) \tag{19}$$

where n is the total number of users in the sector (of both sets) and $\text{frac}_i(t)$ is the fraction of slots used to service this user. The value of $\text{frac}_i(t)$ is calculated by passing through an IIR filter of the appropriate time constant. The nominal value of this metric is one for each user but the actual achieved value will depend upon the recent channel conditions and the presence of the other set of users. Note that when the user is not served, this metric goes down much slower with time than the metric defined for the first set of users.

A low value of this metric for a user provides a high priority for that user. This implies that if two users, one from each set, are at the nominal value (i.e., user fairness equals one) of the user fairness metric but they can't receive service because the scheduler is serving another customer, the user fairness metric for the user from the first set will go down faster and hence it will receive service from the scheduler earlier than the user from the second set. This behavior is correct because the second set of users requires only best effort service while the first set has a strict deadline to meet.

Considering the examples detailed hereinabove, it is possible to identify several differences that aid in determining an appropriate user fairness metric. The time constant, Tc should be kept short, allowing processing and consideration of user requirements for time scales larger than Tc.

Each scheduler may have a nominal operating point, wherein the scheduler will schedule users for service so as to achieve a same numerical value of the user fairness metric for each user. The metric is to be defined such that it takes into account the difference in the requirements for different users. Another consideration is to have the slope around the nominal operating point indicate an increase in fairness as a function of services received. Wherein fairness tends to favor those having a higher priority service at the expense of those having a lower priority service. According to one embodiment, the slope of the user fairness metric as a function of service received is always negative with decreasing service priority. The sensitivity of 1/(user fairness metric) should take into account the flexibility allowed by the requirement of each user.

Implementation of a generalized scheduler to a wireless communication system, such as that illustrated in FIG. 7, applies the fairness criteria and channel condition criteria to the channel scheduling functions. For example, to implement the channel condition metric may involve providing a channel feedback mechanism. The feedback mechanism may be an explicit indicator, such as the DRC provided by the user, or an implicit indicator, such as a C/I measurement. Channel condition indicators and the methods used for evaluation and scheduling may be specific to the system. The channel condition indicators are not limited to those provided hereinabove, but rather the channel condition indicators detailed herein are provided as examples for clarity of understanding. It is desirable to have a reliable measurement of the channel quality.

Similarly, it is desirable to have a reliable measurement of the user fairness metric. As the BS initiates and processes transmissions to the users, the BS has sufficient knowledge of the number of bits or packets transmitted to a given user in a given time period. The BS uses this information in evaluating throughput, accuracy, and fairness. The fairness metric may be a function of the system to which it applies, and therefore is not limited to the fairness metrics provided hereinabove.

While not explicitly stated, there is effectively no limitation preventing service of multiple users at the same time. The generalized scheduler can rank the users in decreasing order of $f(A_i(t), U_i(t))$ and if serving the first one in the list leaves remaining capacity to serve, it can serve the next user simultaneously. The parallel processing of more than one user maximizes bandwidth use and optimizes throughput of the system as a whole.

FIG. 4A illustrates a combination of methods described hereinabove, wherein a data rate threshold is applied to instantaneous values within a predetermined time period, and a GOS criteria is applied over an interval defined by the predetermined time period. The method 400 first initializes a timer at step 402 to track the GOS time period. If the timer has not expired at step 404, i.e., still within the GOS time period, processing continues to step 420 of FIG. 4B to determine a priority function for each user. In the exemplary embodiment, the priority function is the data rate of the user, Ri(t). At step 422 the BS selects a winner according to the priority function and transmits data at step 424. If data is still pending at step 426 processing returns to step 420, else processing ends for this time period.

Continuing with FIG. 4A, if the timer has expired at step 404, i.e., the GOS time period is complete, processing continues to step 406 to receive DRC(s) from other user(s). At step 408 the BS determines the throughput of each user based on the number of bits transmitted. The ratio is then compared to the fairness criteria proportional value, G, as given in Equ. (13) hereinabove. If the ratio of Equ. (13) does not satisfy the equation for any combination of users i and j, at step 414 the BS determines a schedule to achieve or approximately achieve the relationship of Equ. (13). In this case, the BS will typically increase the transmissions to users having low throughput values. In this way, the ratio of user(s) having the lowest throughput to user(s) having the highest throughput is reduced. If the Equ. (13) is satisfied at decision diamond 410, the BS determines a schedule to maintain the throughput ratios approximately below or equal to G at step 414. The schedule is applied at step 416 and processing returns to step 402 to receive the next set of data rate request messages, e.g. DRCs.

A specific example of the method 400 illustrated in FIGS. 4A and 4B is provided in FIG. 5. The method 600 first determines the minimum weight among M users at step 602. The method 600 further determines a collar K for the selected user at step 604 and calculates (M+K) at step 606. For those users transmitting a valid DRC and having pending data, if the weight of a user is much less than the calculated value of (M+K), processing continues to step 612 to select a user based on channel condition. Else, processing continues to step 610 to select user having the minimum weight. The weight of the selected user is updated at step 614 and processing returns to step 602.

One scheduling algorithm originally proposed for the forward link in an HDR system provides a Grade Of Service fairness over as small a time period as allowed by the granularity of HDR encoder packets. The grade of service fairness is defined to mean that the throughput seen by two users over some period of time should be different from each other by no more than a ratio of G:1, where G>=1. Another way to describe the same thing is to say that over an arbitrary time period of length t, $$b_A(t) \leq G * b_B(t) \forall A, B \quad (20)$$

wherein $b_A(t)$ and $b_B(t)$ are the number of bits received by users A and B respectively over the time period of length t. A GOS scheduling algorithm first initializes all of the weights associated with the queues to a nominal weight value of zero. The algorithm then selects a queue for transmission and sends packet from the selected queue. All of the weights are then updated for all queues. The algorithm then selects a next queue for transmission.

As described hereinabove, the exemplary embodiment provides a method for scheduling transmissions among multiple users by applying channel condition indicators and fairness indicators. As an example, consider the proportional-fair scheduler in the framework of a generalized scheduler as according to the exemplary embodiment. The function $f(\ )$ of Equ. (1) is defined as a simple division operator. The channel condition metric Ri(t) is given as:

$$Ri(t) = DRC_i(t)/\text{average\_DRC}_i(t). \quad (21)$$

The user fairness metric is given as:

$$Ui(t) = \text{average\_throughput}_i(t)/\text{average\_DRC}_i(t) \quad (22)$$

Considering the Equ. (1) the resultant method serves the user with the highest $DRC_i(t)/\text{average\_throughput}_i(t)$, which is the proportional-fair scheduler. In this case, all averaging is done using an Infinite Impulse Response, IIR, filter with a predetermined time constant. Examination of the expressions provided hereinabove reveals that the multi-user diversity gain(s) are a function of the channel condition metric, i.e., are introduced by the channel condition metric. The time period over which DRC is averaged for each user is used to compute the denominator of the channel condition metric. The user fairness metric gives the actual fairness in the algorithm. The channel condition metric for each user is given values around one. Hence, the relative values of the throughputs received by different users over a long period of time are affected mostly by the user fairness metric and not by the channel condition metric. In particular, the relative throughput achieved by the users will be such that each user fairness metric achieves a same value.

Additionally, the user fairness metric for a given user can be restated as:

$$Ui(t) = (\text{fraction of slots served}) * \frac{DRCave \text{ while served}}{DRCave}. \quad (23)$$

If the DRC of all the users (in dB) vary with the same statistics around the mean, the ratio of DRCave_while_ served and DRCave is the same for all users resulting in the equal time property of the algorithm.

An advantage of rewriting a proportional-fair scheduler formula is in obtaining an equal time scheduler. This equal time scheduler has gains due to multi-user diversity. The channel condition metric remains the same as according to the proportional-fair algorithm, but now guarantees equal time to each user by application of a user fairness metric defined by the fraction_of_slots_served. In one embodiment this fraction is averaged using an IIR filter having a same time constant as that currently used for the proportional-fair algorithm.

Further, as discussed hereinabove, the exemplary embodiment allows differentiation of treatment for individual users or groups of users according to a classification scheme. In this way different users may be assigned different user fairness metric values. If the user fairness metric for user class j is defined to be:

$$Ui(t) = a_j * \text{average\_throughput}(t)/\text{average\_DRC}(t), \quad (24)$$

Wherein user class j will receive a relative priority proportional to $(1 a_j)$ compared to other user classes. For example, considering application of a GOS algorithm to a generalized scheduler, the channel condition metric is one for all the users at all times (i.e., the algorithm does not take advantage of the multi-user diversity) and the user fairness metric is the weight assigned to the user. Recall that the weights were assigned in a manner that achieved the GOS fairness while maximizing the sector throughput. The combiner function is the division operator as given in equation (10). This example illustrates that different selections for f, $A_f(t)$ and $U_f(t)$ may affect a same algorithm. In other words, when the priority functions are evaluated, the resultant algorithm is the same for different combinations of f, $A_f(t)$ and $U_f(t)$. For example, consider f( ) to be the difference operator, i.e., f(a,b)=a−b, with zero as the channel condition metric, and weight as the user fairness metric. The resulting approaches a GOS algorithm, as the user currently being served is the user having the lowest weight.

In the modified grade of service algorithm, a parameter referred to as a collar is used and all users that have weight within a margin or range of a minimum weight value, i.e., min_weight to (min_weight+collar), are served based on the channel condition. If no user is found within that range having pending data to send or sending a valid DRC, the method selects the user having the minimum weight among the users. The user fairness metric is then defined to be one for all users that have a weight within the range, i.e., between min_weight and min_weight+collar and infinity for all other users. A variety of channel condition metrics may be used for application to the exemplary embodiment, including, but not limited to: 1) DRC; and 2) DRC/DRCave.

An enhanced equal time scheduler may be developed based on the equal time scheduler. According to one embodiment, a time constant Tc is associated with the user fairness metric in the enhanced equal time scheduler method. Defining the time constant Tc as equal to a predetermined number of slots may be based on experience with a Transmission Control Protocol, TCP, type simulation wherein throughput variation over time scales smaller than Tc are not significant. It is possible, however, that different users have different flexibility in applied time scales based on the application currently running. In one embodiment, the user fairness metric continues to compute the average throughput per user or group of users, wherein the user fairness metric computation uses individual, i.e., different, time constants to compute the average per user. The use of different time constants per user, results in different variations around a mean fraction of slots per user. Small variations are experienced by application of a small time constant. The fraction of slots per user is kept approximately equal. A similar enhancement is possible with other user fairness metrics, for example, the metric used by the proportional-fair scheduler (average_throughput/laverage_ DRC). Application of the priority function f( ) provides differing variability with respect to each individual user's throughput.

For HDR operation of system 120, AN 122 and AT 126 each include a processor and at least one memory storage device in addition to signal processing modules. The processor may be a central processing unit or may be a dedicated controller. The memory storage device stores computer-readable instructions and/or routines for controlling communication within the wireless system 120. Within AN 122, the memory storage device may store instructions to control data transmissions. Within AT 126, the memory storage device may store instructions controlling data transmissions, including data requests.

In one embodiment, a wireless communication system supports a transmission protocol that may result in an actual received data rate that is higher than the requested data rate. One such system is an HDR system incorporating an ARQ, scheme. In such a system the user transmits a data rate request message, such as a DRC message, to a transmitter, such as a base station or access terminal. The DRC message indicates the total number of slots required for transmission of the requested data. The transmitter sends the data in less than the total number of slots indicated in the DRC message. If the receiver is able to decode the information in less than the total number of slots, the receiver sends an acknowledge message to the transmitter and the transmitter terminates transmission. Else if the transmitter does not receive an acknowledge, the transmission continues and may proceed to transmit for the identified total number of slots if no acknowledge is received.

As the receive data rate may be different from the requested data rate, the system designer may desire to use the actual received data rate for scheduling purposes. A problem exists in determining the received data rate, as this rate is not known a priori by the transmitter, but rather is determined in situ during the transmission process. In other words, the transmitter knows the requested data rate, such as DRC, and begins transmitting to the receiver with the understanding that the transmission may require all slots identified by the DRC. The transmitter discovers that the receiver is able to accept the transmission in fewer slots when the receiver sends an acknowledge message. This is typically after the scheduling algorithm has determined a selection. In effect, a wireless communication system supporting a physical layer with an ARQ type scheme decouples the rate requested by the DRC and the actual received rate. Scheduling fairness is impacted when the DRC is used for selection of a transmission target.

As an example, consider a system having two access terminals, AT1 and AT2. AT1 requests data over a total of two slots for a rate of 307.2 kbps, and AT2 requests data over a total of 1 slot for a rate of 614.4 kbps. Applying a proportional-fair type scheduling algorithm, AT1 and AT2 will be scheduled for equal time, wherein the throughput of AT1 will be half of the throughput of AT2, i.e., throughput of AT1 will be 153.6 kbps, throughput of AT2 will be 307.2 kbps. If AT1 sends an acknowledge message after one slot transmission is received all the time, the received rate for AT1 is 614.4 kbps. Therefore, the throughput of AT1 is 204.8 kbps or ⅓ of 614.4 kbps, and the throughput of AT2 is 409.6 kbps or ⅔ of 614.4 kbps. The time allotment is then scheduled as ⅓ to AT1 and ⅔ to AT2. The fairness criteria would be violated. It is desired that users get throughput in proportion to the actual received rate rather than the requested rate. As the ARQ type schemes tend to benefit the data rates of users having low data rates, the typical proportional-fair type algorithms will counter that benefit by redistributing system resources to all users.

One embodiment, discussed hereinabove, solves this problem by combining the fair proportional type algorithm with a GoS type scheduling. For short time intervals, the combination process uses the fair proportional type algorithm, and applies the GoS constraints over a longer time interval. As the GoS fairness criteria evaluates the total number of bits or bytes sent over a predefined period of time, the actual requested data rate does not enter directly into the selection process.

In an unequal GoS algorithm, two grades may be applied: high and low. Each user is assigned a weight, as discussed hereinabove. When a high grade user is serviced, i.e., is the recipient of a data transmission, the user's weight is increased by a predetermined value, such as one. When a low grade user is serviced, the user's weight is increased by an adjusted amount, wherein the adjusted amount is the predetermined value adjusted by a gain factor G. A given user changes grades depending on the requested data rate and average throughput. Users above a threshold throughput value are assigned to the high grade and are intended to raise the average throughput value. Users below the threshold are assigned to the low grade to minimize any impact to the throughput. The threshold may be computed per slot using DRC to determine a theoretical average throughput achievable using a GoS type scheduler. The calculation may ignore channel variations.

A problem exists for the GoS algorithm, as described hereinabove for the proportional-fair algorithm, as the DRC differ from the actual received data rate. One embodiment solves the problem by tracking the actual average throughput per sector using an IIR filter. The filter time constant may be fixed to a value determined by simulation or in operation. According to this embodiment, the throughput of a given sector or cell is defined as:

$$T[n+1]=T[n]*(1-\alpha)+\alpha*R[n] \quad (25)$$

wherein T is the threshold, R is the rate of service at time instance n, and $\alpha$ is a predetermined value. The throughput is then used as a threshold to assign high and low grade users.

To further take advantage of multi-user diversity while applying a GoS type scheduling algorithm as modified and described hereinabove, one embodiment applies a predetermined time period. Within the time period, the process takes advantage of multi-user diversity, and over the time period a GoS type scheduling algorithm is applied. The method tracks the recent average of requested data rates for each user by passing the corresponding DRC through an IIR filter. For each user a ratio is calculated of current DRC to recent average requested data rate. The user having the highest ratio receives service. In an alternate embodiment, the user having the highest ratio receives service if all weights are within a predetermined range of values. As the DRC value is part of the numerator and denominator of the ratio, the selection process is expected to reflect the actual received data rates and not the requested rates.

Still another embodiment seeks to solve the discrepancy between the requested data rate and the received data rate by modification of the proportional-fair type scheduling algorithm. The proportional-fair type algorithm is based on a ratio of the requested data rate to the average throughput per user, wherein the user having the highest ratio is selected for service. The average throughput is calculated as:

$$T_{ave}[n+1]=T_{ave}[n]*(1-\alpha)+\alpha*R[n] \quad (26)$$

wherein $T_{ave}$ is the average threshold, R is the rate of service at time instance n, and $\alpha$ is a predetermined value. The modification alters the value of the throughput, defined as:

$$T_{ave}[n+1]=T_{ave}[n]*(1-\alpha)+\alpha*DRC[n] \quad (27)$$

Application of DRC in calculating the average threshold value results in an average threshold that is potentially lower than the actual received throughput. By reducing the denominator of the ratio of requested data rate to average throughput, the ratio is increased, thereby resulting in the desired effect.

Thus, a novel and improved method and apparatus for scheduling transmissions in a communications system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. In a wireless communication system a scheduling method, comprising:

receiving channel condition indicators from a plurality of mobile users, wherein the channel condition indicators correspond to forward link communications;

determining a function (A) corresponding to each of the channel condition indicators, given as:

$$A_i(t)=f(B_i(t)/B\_AVE_i(t) \text{ for } i=1,\ldots,N),$$

wherein $A_i(t)$ is a function of the channel condition indicator for an ith mobile station, $B_i(t)$ is the channel condition indicator from the ith mobile station at time t, $B\_AVE_i(t)$ is an average value of channel condition indicators recently received from the ith mobile station, and N is the total number of mobile stations in the plurality of mobile stations;

determining a fairness indicator as a function of throughput to the plurality of mobile users; and determining a transmission schedule for the plurality of mobile users, wherein the transmission schedule is a function of the channel condition indicators and fairness indicators.

2. The method as in claim 1, determining a transmission schedule further comprises:

calculating scheduling indicators for the plurality of mobile stations as a function of the channel condition indicator and the fairness indicator; and selecting at least one of the plurality of mobile stations for a next transmission based on the scheduling indicators.

3. The method as in claim 2, wherein calculating scheduling indicators comprises:

for each of the plurality of mobile stations, determining a ratio of a corresponding channel condition indicator to a corresponding fairness indicator.

4. The method as in claim 1, wherein the transmission schedule is a function of:

$$A_i(t)=B(t)/B\_AVE(t) \text{ for } i=1, \ldots N.$$

5. The method as in claim 4, wherein the channel condition indicator is a data rate control request, and the average value of channel condition indicators is a filtered data rate control request from the ith mobile station.

6. The method as in claim 5, wherein calculating a function of the channel condition indicator comprises:

calculating the filtered data rate control request from the ith mobile station at time t as:

$$B\_AVE_i(t+1)=B\_AVE_i(t)[1-(1/T_c)]+B_i(t)[1/T_c],$$

wherein $T_c$ is a fairness time period.

7. The method as in claim 6, wherein calculating a function of the channel condition indicator further comprises:

assigning a weight to each of the recently received data rate control requests.

8. The method as in claim 1, wherein for each mobile station the fairness indicator is a fraction of time the mobile station was served during a fairness time period.

9. A program embodied on a computer-readable medium containing computer-executable instructions, comprising:

a first set of instructions for processing channel condition indicators received from a plurality of mobile users;

a second set of instructions for determining a fairness indicator as a function of throughput to the plurality of mobile users;

a third set of instructions for calculating a function (A) corresponding to each of the channel condition indicators, given as:

$$A_i(t)=f(B_i(t)/B\_AVE_i(t) \text{ for } i=1, \ldots N,$$

wherein $A_i(t)$ is a function of the channel condition indicator for an ith mobile station, $B_i(t)$ is the channel condition indicator from the ith mobile station at time t, $B\_AVE_i(t)$ is an average value of channel condition indicators recently received from the ith mobile station, and N is the total number of mobile stations in the plurality of mobile stations; and a fourth set of instructions for determining a transmission schedule for the plurality of users as a function of the channel condition indicators and the fairness indicators.

10. The program as in claim 9, wherein determining a transmission schedule for the plurality of users as a function of the channel condition indicators and the fairness indicators is done by balancing the channel condition indicators with the fairness indicators.

11. In a wireless communication system, an access network, comprising:

receiving means for receiving channel condition indicators from a plurality of mobile users, wherein the channel condition indicators correspond to forward link communications;

means for determining a function (A) corresponding to each of the channel condition indicators, given as:

$$A_i(t)=f(B_i(t)/B\_AVE_i(t) \text{ for } i=1, \ldots N,$$

wherein $A_i(t)$ is a function of the channel condition indicator for an ith mobile station, $B_i(t)$ is the channel condition indicator from the ith mobile station at time t, $B\_AVE_i(t)$ is an average value of channel condition indicators recently received from the ith mobile station, and N is the total number of mobile stations in the plurality of mobile stations;

means for determining a fairness indicator as a function of throughput to the plurality of mobile users; and means for determining a transmission schedule for the plurality of mobile users, wherein the transmission schedule is a function of the channel condition indicators and fairness indicators.

12. A method for scheduling data transmissions in a wireless communication system, comprising:

receiving a value for a delivery priority parameter from each of a plurality of mobile users;

for each of the plurality of mobile users, applying a mapped priority parameter value corresponding to an operating point;

determining a delivery priority parameter value corresponding to the mapped priority parameter value;

if any of the delivery priority parameters are different types, mapping each delivery priority parameter to a mapped priority parameter; and determining the operating point based on the mapped priority parameters of the plurality of mobile users.

13. The method as in claim 12 wherein a first delivery priority parameter is a desired time allotment.

14. The method as in claim 12 wherein a second delivery priority parameter is a desired throughput.

15. The method as in claim 12 wherein a third delivery priority parameter is a desired delay.

16. A system controller in a wireless communication system, comprising:

means for receiving a delivery priority parameter from each of a plurality of mobile users;

means for applying a mapped priority parameter value corresponding to an operating point for each of the plurality of mobile users;

means for determining a delivery priority parameter value corresponding to the mapped priority parameter value;

means for mapping each delivery priority parameter to a mapped priority parameter if any of the delivery priority parameters are different types; and means for determining the operating point based on the mapped priority parameters of the plurality of mobile users.

17. An apparatus in a wireless communication system, comprising:

a processing element; and a memory storage element coupled to the processing element, the memory storage element adapted for storing computer-readable instructions for implementing:

receiving a delivery priority parameter from each of a plurality of mobile users;

applying a mapped priority parameter value corresponding to an operating point for each of the plurality of mobile users;

determining a delivery priority parameter value corresponding to the mapped priority parameter value;

mapping each delivery priority parameter to a mapped priority parameter if any of the delivery priority parameters are different types; and determining the operating point based on the mapped priority parameters of each the plurality of mobile users.

18. The apparatus as in claim 17, wherein the computer-readable instructions further implement:

applying the operating point to each of the plurality of mobile users, wherein the operating point determines mapped priority parameter values corresponding to each of the plurality of mobile users.

19. The apparatus as in claim 18, wherein the computer-readable instructions further implement:

scheduling the plurality of mobile users according to the operating point using the mapped priority parameter values.

* * * * *